United States Patent
Zhang et al.

(10) Patent No.: US 11,740,523 B2
(45) Date of Patent: Aug. 29, 2023

(54) DISPLAY PANEL AND DISPLAY DEVICE

(71) Applicants: Hefei BOE Display Technology Co., Ltd., Hefei (CN); BOE Technology Group Co., Ltd., Beijing (CN)

(72) Inventors: Chunxu Zhang, Beijing (CN); Yuntian Zhang, Beijing (CN); Xiaoting Jiang, Beijing (CN); Haipeng Yang, Beijing (CN); Ke Dai, Beijing (CN)

(73) Assignees: Hefei BOE Display Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/772,674

(22) PCT Filed: Jun. 8, 2021

(86) PCT No.: PCT/CN2021/098966
§ 371 (c)(1),
(2) Date: Apr. 28, 2022

(87) PCT Pub. No.: WO2022/012227
PCT Pub. Date: Jan. 20, 2022

(65) Prior Publication Data
US 2023/0042675 A1   Feb. 9, 2023

(30) Foreign Application Priority Data

Jul. 17, 2020 (CN) .......................... 202010696740.9

(51) Int. Cl.
*G02F 1/1333* (2006.01)
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC .................................................. G02F 1/1362
See application file for complete search history.

(56) References Cited

U.S. PATENT DOCUMENTS

| 7,663,729 B2 | 2/2010 | Chiang |
| 7,911,579 B2 | 3/2011 | Chiang |

(Continued)

FOREIGN PATENT DOCUMENTS

| CN | 1971390 A | 5/2007 |
| CN | 101315506 A | 12/2008 |

(Continued)

OTHER PUBLICATIONS

First Office Action, including Search Report, for Chinese Patent Application No. 202010696740.9, dated Jun. 17, 2022, 35 pages.

*Primary Examiner* — Sang V Nguyen
(74) *Attorney, Agent, or Firm* — Westman, Champlin & Koehler, P.A.

(57) ABSTRACT

A display panel and a display device are provided. The display panel includes a first substrate and a second substrate arranged oppositely. The first substrate includes a spacer. The second substrate includes: a second base substrate; a data line including, a body portion and a bending portion; and a sub-pixel including a light transmission region. An orthographic projection of the spacer on the second base substrate is adjacent to that of the light transmission region on the second base substrate, the orthographic projection of the spacer on the second base substrate is spaced apart from that of the data line on the second base substrate; an orthographic projection of the bending portion on the second base substrate is bent toward a direction away from the orthographic projection of the spacer on the second base substrate with respect to an orthographic projection of the body portion on the second base substrate.

16 Claims, 12 Drawing Sheets

(56) References Cited

U.S. PATENT DOCUMENTS

| | | |
|---|---|---|
| 9,897,863 B2 | 2/2018 | Li et al. |
| 10,429,708 B2 | 10/2019 | Liu et al. |
| 10,545,361 B2 | 1/2020 | Song et al. |
| 10,921,649 B2 | 2/2021 | Nieh et al. |
| 2004/0109125 A1 | 6/2004 | Choi |
| 2007/0030438 A1 | 2/2007 | Chiang |
| 2008/0123007 A1* | 5/2008 | Cui .................. G02F 1/13394 349/43 |
| 2010/0091235 A1 | 4/2010 | Chiang |
| 2010/0097538 A1* | 4/2010 | Ota .................. G02F 1/136204 349/48 |
| 2012/0008059 A1* | 1/2012 | Kim ................. G02F 1/134309 349/42 |
| 2014/0217412 A1 | 8/2014 | Yanagisawa et al. |
| 2015/0331272 A1* | 11/2015 | Komatsu ........... G02F 1/136286 349/155 |
| 2016/0181279 A1 | 6/2016 | Choung et al. |
| 2016/0266431 A1 | 9/2016 | Li et al. |
| 2018/0059467 A1 | 3/2018 | Song et al. |
| 2018/0239209 A1* | 8/2018 | Oka .................. G02F 1/134309 |
| 2018/0284515 A1* | 10/2018 | Higano ............. G02F 1/133305 |
| 2019/0041710 A1* | 2/2019 | Liu .................... G02F 1/133345 |
| 2019/0346720 A1* | 11/2019 | Nieh ................... G02F 1/13458 |
| 2021/0132448 A1 | 5/2021 | Nieh et al. |
| 2021/0356831 A1* | 11/2021 | Liu ....................... G02F 1/1339 |

FOREIGN PATENT DOCUMENTS

| | | | |
|---|---|---|---|
| CN | 101650503 A | 2/2010 | |
| CN | 101825814 A | 9/2010 | |
| CN | 204101855 U | 1/2015 | |
| CN | 105487278 A | 4/2016 | |
| CN | 106405951 A | 2/2017 | |
| CN | 107255879 A | 10/2017 | |
| CN | 110456576 A | 11/2019 | |
| CN | 212846287 * | 3/2021 | ........... G02F 1/1333 |
| KR | 20040107649 A | 12/2004 | |
| KR | 20110115714 A | 10/2011 | |
| TW | 200705062 A | 2/2007 | |

\* cited by examiner

DISPLAY PANEL AND DISPLAY DEVICE

CROSS REFERENCE TO RELATED APPLICATION(S)

This application is a Section 371 National Stage Application of International Application No. PCT/CN2021/098966, filed on Jun. 8, 2021, which published as WO 2022/012227 A1, on Jan. 20, 2022, in Chinese, entitled "DISPLAY PANEL AND DISPLAY DEVICE", which claims priority to Chinese Patent Application No. 202010696740.9, filed on Jul. 17, 2020, the contents of which are incorporated herein by reference in their entireties.

TECHNICAL FIELD

The present disclosure relates to a field of a display technology, in particular to a display panel and a display device including the display panel.

BACKGROUND

A liquid crystal display includes a liquid crystal display panel, and the liquid crystal display panel includes an array substrate and a counter substrate that are arranged in cell alignment and a liquid crystal layer located between the array substrate and the counter substrate. The array substrate and the counter substrate are sealed by a sealant. In a liquid crystal cell of the liquid crystal display panel, in order to ensure a uniformity of a cell gap of the liquid crystal cell at various positions, a spacer (referred to as PS) with an elastic restoring force is generally provided between the array substrate and the counter substrate. The spacer is in a compressed state and functions to support the liquid crystal cell, so as to keep the cell gap of the liquid crystal display panel stable and uniform. With a continuous development of the display technology, a resolution of a display device has been continuously improved, and a size of each pixel has been continuously reduced accordingly. Thus, how to arrange the spacer in a small-sized pixel has gradually become a topic of concern to researchers.

The above content described in this section is only for the understanding of the background of the inventive concept of the present disclosure. Therefore, the above content may include a content that does not constitute the related art.

SUMMARY

In an aspect, a display panel is provided, including:
a first substrate, including:
a first base substrate; and
a plurality of spacers arranged on the first base substrate; and
a second substrate arranged opposite to the first substrate, including:
a second base substrate;
a plurality of gate lines and a plurality of data lines arranged on the second base substrate, wherein each of the plurality of gate lines is arranged in a row direction, and each of the plurality of data lines is arranged in a column direction; and
a plurality of sub-pixels arranged on the second base substrate in an array in the row direction and the column direction, wherein the plurality of gate lines and the plurality of data lines intersect to define the plurality of sub-pixels, and each of the plurality of sub-pixels includes a light transmission region,
wherein the plurality of spacers include at least one first spacer, the plurality of data lines include at least a first data line, the plurality of sub-pixels include a first sub-pixel, and the first data line is arranged adjacent to the first sub-pixel;
wherein an orthographic projection of the first spacer on the second base substrate is adjacent to an orthographic projection of the light transmission region of the first sub-pixel on the second base substrate, and the orthographic projection of the first spacer on the second base substrate is spaced apart from an orthographic projection of the first data line on the second base substrate; and
wherein the first data line includes a body portion and a bending portion, a projection of the bending portion in the column direction at least partially overlaps a projection of the first spacer in the column direction, and an orthographic projection of the bending portion on the second base substrate is bent toward a direction away from the orthographic projection of the first spacer on the second base substrate with respect to an orthographic projection of the body portion on the second base substrate.

According to some exemplary embodiments, the bending portion includes a bending body portion and two bending connection portions, an arrangement direction of the bending body portion is parallel to an arrangement direction of the body portion of the first data line, one end of the bending body portion is connected to one section of the body portion of the first data line through one of the bending connection portions, and the other end of the bending body portion is connected to the other section of the body portion of the first data line through the other of the bending connection portions.

According to some exemplary embodiments, the plurality of data lines further include a second data line arranged adjacent to the first sub-pixel; and an orthographic projection of the first data line on the second base substrate and an orthographic projection of the second data line on the second base substrate are respectively located on both sides of the orthographic projection of the first spacer on the second base substrate in the row direction, and a distance between the orthographic projection of the second data line on the second base substrate and the orthographic projection of the first spacer on the second base substrate in the row direction is greater than a distance between the orthographic projection of the first data line on the second base substrate and the orthographic projection of the first spacer on the second base substrate in the row direction.

According to some exemplary embodiments, the second data line includes a body portion and a bending portion, a projection of the bending portion of the second data line in the column direction at least partially overlaps a projection of the first spacer in the column direction, and an orthographic projection of the bending portion of the second data line on the second base substrate is bent toward a direction away from the orthographic projection of the first spacer on the second base substrate with respect to the orthographic projection of the body portion of the second data line on the second base substrate.

According to some exemplary embodiments, the bending portion of the second data line includes a bending body portion and two bending connection portions, an arrangement direction of the bending body portion of the second data line is parallel to an arrangement direction of the body portion of the second data line, one end of the bending body portion of the second data line is connected to one section of the body portion of the second data line through one of the bending connection portions of the second data line, and the other end of the bending body portion of the second data line is connected to the other section of the body portion of the second data line through the other of the bending connection portions of the second data line.

According to some exemplary embodiments, the plurality of gate lines include a first gate line arranged adjacent to the first sub-pixel, and the orthographic projection of the first spacer on the second base substrate falls within an orthographic projection of the first gate line on the second base substrate.

According to some exemplary embodiments, the first gate line includes a first widened portion and a second widened portion, an orthographic projection of the first widened portion and the second widened portion on the second base substrate is located between the orthographic projection of the first data line on the second base substrate and the orthographic projection of the second data line on the second base substrate; and a size of each of the first widened portion and the second widened portion in the column direction is greater than a size of a remaining portion of the first gate line in the column direction, and the orthographic projection of the first spacer on the second base substrate falls within an orthographic projection of the first widened portion of the first gate line on the second base substrate.

According to some exemplary embodiments, the second substrate further includes a plurality of thin film transistors arranged on the second base substrate, and the plurality of thin film transistors include at least one first thin film transistor arranged adjacent to the first sub-pixel; and an orthographic projection of the first thin film transistor on the second base substrate falls within an orthographic projection of the second widened portion of the first gate line on the second base substrate.

According to some exemplary embodiments, the orthographic projection of the first thin film transistor on the second base substrate is located between the orthographic projection of the first spacer on the second base substrate and the orthographic projection of the bending portion of the second data line on the second base substrate.

According to some exemplary embodiments, the first gate line further includes a plurality of inclined portions, and an arrangement direction of an orthographic projection of each inclined portion on the second base substrate forms an acute angle with the row direction; and the orthographic projection of the bending portion of the first data line on the second base substrate at least partially overlaps an orthographic projection of one inclined portion of the first gate line on the second base substrate, and the orthographic projection of the bending portion of the second data line on the second base substrate at least partially overlaps an orthographic projection of another inclined portion of the first gate line on the second base substrate.

According to some exemplary embodiments, the plurality of sub-pixels further include a second sub-pixel adjacent to the first sub-pixel, the plurality of data lines further include a third data line, the first data line and the third data line are respectively located on both sides of the second sub-pixel; and the third data line includes a bending portion, a projection of the bending portion of the third data line in the column direction at least partially overlaps the projection of each of the bending portion of the first data line and the bending portion of the second data line in the column direction, and a bending direction of the bending portion of the third data line is identical with one of a bending direction of the bending portion of the first data line or a bending direction of the bending portion of the second data line.

According to some exemplary embodiments, the second substrate further include a plurality of common electrode lines arranged on the second base substrate, and each of the common electrode lines is arranged in the row direction; and the plurality of common electrode lines include a first common electrode line, an orthographic projection of the first common electrode line on the second base substrate is adjacent to the orthographic projection of the first gate line on the second base substrate, the first common electrode line includes a body portion and a bending portion, a projection of the bending portion of the first common electrode line in the row direction at least partially overlaps a projection of the first widened portion in the row direction, and an orthographic projection of the bending portion of the first common electrode line on the second base substrate is bent toward a direction away from the orthographic projection of the first widened portion on the second base substrate with respect to the orthographic projection of the body portion of the first common electrode line on the second base substrate.

According to some exemplary embodiments, the first widened portion protrudes toward the first common electrode line with respect to each of the second widened portion and the inclined portion.

According to some exemplary embodiments, a spacing distance between the first widened portion and the bending portion of the first common electrode line in the column direction is equal to a spacing distance between the second widened portion and the body portion of the first common electrode line in the column direction.

According to some exemplary embodiments, a size of the bending portion of the first common electrode line in the column direction is greater than a size of the body portion of the first common electrode line in the column direction.

According to some exemplary embodiments, the first thin film transistor includes an active layer, a gate electrode, a first electrode and a second electrode, and the second substrate further includes a pixel electrode arranged on the second base substrate; the first electrode is electrically connected to the second data line, and the second electrode is electrically connected to the pixel electrode; the first electrode includes a first portion and a second portion, the first portion of the first electrode extends directly from the second data line in the row direction, and an orthographic projection of the second portion of the first electrode on the second base substrate falls within the orthographic projection of the second widened portion on the second base substrate; the second electrode includes a first portion and a second portion, an orthographic projection of the first portion of the second electrode on the second base substrate at least partially overlaps an orthographic projection of the pixel electrode on the second base substrate, and an orthographic projection of the second portion of the second electrode on the second base substrate falls within the orthographic projection of the second widened portion on the second base substrate; a size of the first portion of the first electrode in the column direction is greater than a size of the second portion of the first electrode in the row direction, and a size of the first portion of the second electrode in the row direction is greater than a size of the second portion of the second electrode in the row direction.

According to some exemplary embodiments, the second portion of the first electrode is arranged parallel to the second portion of the second electrode, and the second portion of the second electrode is arranged closer to the first widened portion than the second portion of the first electrode.

According to some exemplary embodiments, the orthographic projection of the first spacer on the second base substrate and the orthographic projection of the bending portion of the first data line on the second base substrate are spaced apart in the row direction by a first distance, and the orthographic projection of the first spacer on the second base substrate and the orthographic projection of the second portion of the second electrode on the second base substrate are spaced apart in the row direction by a second distance which is equal to the first distance.

According to some exemplary embodiments, the first distance is greater than or equal to 10 microns.

According to some exemplary embodiments, the second substrate includes a first bump structure and a second bump structure arranged on the second base substrate and located on both sides of the first spacer in the row direction; and an orthographic projection of the first bump structure on the second base substrate at least partially overlaps the orthographic projection of the bending portion of the first data line on the second base substrate, and an orthographic projection of the second bump structure on the second base substrate at least partially overlaps the orthographic projection of the first thin film transistor on the second base substrate.

According to some exemplary embodiments, the second substrate further includes a third bump structure and a fourth bump structure arranged on the second base substrate and located on both sides of the first spacer in the column direction; and an orthographic projection of the third bump structure on the second base substrate at least partially overlaps the orthographic projection of the bending portion of the first common electrode line on the second base substrate, and an orthographic projection of the fourth bump structure on the second base substrate at least partially overlaps the orthographic projection of the pixel electrode of the first sub-pixel on the second base substrate.

According to some exemplary embodiments, the second substrate includes a first conductive layer and a second conductive layer arranged on the second base substrate, and the second conductive layer is arranged on a side of the first conductive layer away from the second base substrate; and the gate line and the common electrode line are located in the first conductive layer, and the data line, the first electrode of the thin film transistor and the second electrode of the thin film transistor are located in the second conductive layer.

According to some exemplary embodiments, the third bump structure includes a first boss located in the second conductive layer, and an orthographic projection of the first boss on the second base substrate falls within the orthographic projection of the bending portion of the first common electrode line on the second base substrate.

According to some exemplary embodiments, the fourth bump structure includes a second boss located in the first conductive layer and a third boss located in the second conductive layer, and an orthographic projection of the third boss on the second base substrate falls within an orthographic projection of the second boss on the second base substrate.

According to some exemplary embodiments, each of the orthographic projection of the first spacer on the second base substrate and the orthographic projection of the first widened portion on the second base substrate has an octagonal shape, and an area of the orthographic projection of the first spacer on the second base substrate is less than an area of the orthographic projection of the first widened portion on the second base substrate.

According to some exemplary embodiments, each of the first data line, the second data line and the third data line includes a plurality of bending portions; and the plurality of bending portions included in a same data line have a same bending direction, or at least two of the plurality of bending portions included in the same data line have different bending directions.

According to some exemplary embodiments, the first substrate further includes a black matrix arranged on the first base substrate, and each of an orthographic projection of the gate line on the first base substrate, an orthographic projection of the data line on the first base substrate, an orthographic projection of the common electrode line on the first base substrate and an orthographic projection of the thin film transistor on the first base substrate falls within an orthographic projection of the black matrix on the first base substrate.

According to some exemplary embodiments, the first sub-pixel is a red sub-pixel.

According to some exemplary embodiments, the second substrate includes a first electrode layer and a second electrode layer arranged on the second base substrate, and the second electrode layer is arranged on a side of the first electrode layer away from the second base substrate; and the second substrate further includes a common electrode arranged on the second base substrate, the pixel electrode is arranged in one of the first electrode layer and the second electrode layer, and the common electrode is arranged in the other of the first electrode layer and the second electrode layer.

In another aspect, a display device including the display panel described above is provided.

BRIEF DESCRIPTION OF THE DRAWINGS

The features and advantages of the present disclosure will become more apparent by describing in detail exemplary embodiments of the present disclosure with reference to the accompanying drawings, in which.

DETAILED DESCRIPTION OF EMBODIMENTS

Figure 1:
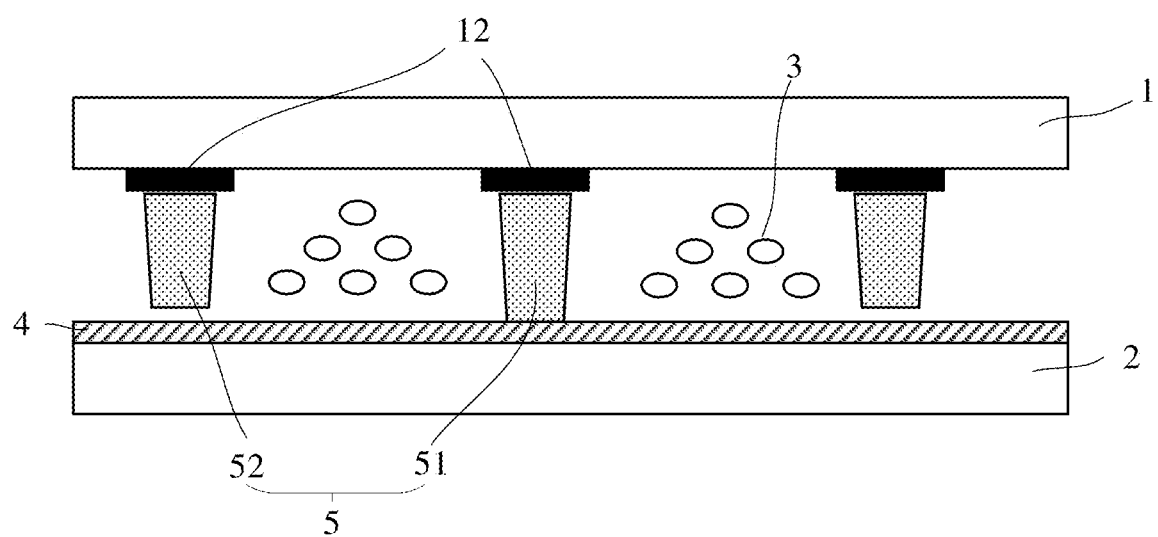
FIG. 1 shows a schematic cross-sectional view of a display panel according to some exemplary embodiments of the present disclosure.

In order to make the objectives, technical solutions and advantages of the present disclosure more clear, the technical solutions of the embodiments of the present disclosure are clearly and completely described below with reference to the accompanying drawings. Obviously, the described embodiments are only a part but not all of the embodiments of the present disclosure. Based on the embodiments of the present disclosure, all other embodiments obtained by those ordinary skilled in the art without carrying out inventive effort fall within the protection scope of the present disclosure.

It should be noted that, in the accompanying drawings, for clarity and/or description purposes, size and relative size of elements may be enlarged. Accordingly, the size and relative size of each element need not to be limited to those shown in the drawings. In the specification and drawings, the same or similar reference numerals indicate the same or similar components.

When an element is described as being "on", "connected to" or "coupled to" another element, the element may be directly on the another element, directly connected to the another element, or directly coupled to the another element, or an intermediate element may exist. However, when an element is described as being "directly on", "directly connected to" or "directly coupled to" another element, no intermediate element is provided. Other terms and/or expressions used to describe the relationship between elements, for example, "between" and "directly between", "adjacent" and "directly adjacent", "on" and "directly on", and so on, should be interpreted in a similar manner. In addition, the term "connection" may refer to a physical connection, an electrical connection, a communication connection, and/or a fluid connection. In addition, X-axis, Y-axis and Z-axis are not limited to three axes of a rectangular coordinate system, and may be interpreted in a broader meaning. For example, the X-axis, the Y-axis and the Z-axis may be perpendicular to each other, or may represent different directions that are not perpendicular to each other. For the objective of the present disclosure, "at least one of X, Y or Z" and "at least one selected from a group consisting of X, Y and Z" may be interpreted as only X, only Y, only Z, or any combination of two or more of X, Y and Z, such as XYZ, XYY, YZ and ZZ. As used herein, the term "and/or" includes any and all combinations of one or more of the listed related items.

It should be noted that although terms "first", "second", and so on may be used herein to describe various components, members, elements, regions, layers and/or parts, these components, members, elements, regions, layers and/or parts should not be limited by these terms. Rather, these terms are used to distinguish one component, member, element, region, layer and/or part from another component, member, element, region, layer and/or part. Thus, for example, a first component, a first member, a first element, a first region, a first layer and/or a first part discussed below may be referred to as a second component, a second member, a second element, a second region, a second layer and/or a second part without departing from the teachings of the present disclosure.

For ease of description, spatial relationship terms, such as "upper", "lower", "left", "right", may be used herein to describe the relationship between one element or feature and another element or feature as shown in the figure. It should be understood that the spatial relationship terms are intended to cover other different orientations of the device in use or operation in addition to the orientation described in the figure. For example, if the device in the figure is turned upside down, an element or feature described as "below" or "under" another element or feature will be oriented "above" or "on" the another element or feature.

It should be understood by those skilled in the art that herein, unless otherwise specified, the expression "height" or "thickness" refers to a size in a direction perpendicular to a surface of a display panel (e.g., a color filter substrate or an array substrate) on which various film layers are arranged, that is, a size in a light exit direction of the display panel, or a size in a Z-direction in the drawings.

As used herein, unless otherwise specified, expressions such as "located in a same layer", "provided in a same layer" or "arranged in a same layer", etc. mean that the referenced layers, elements, components, structures or devices are composed of a same material and formed by a same patterning process.

As used herein, expressions such as "projection in a row direction", "projection in a X direction", etc. mean a projection formed in the row direction or the X direction by projecting a planar layer, element, component, structure or device on a plane formed by the row direction and a column direction (that is, XY plane); if considered in terms of a three-dimensional structure, the expressions mean a projection of a three-dimensional layer, element, component, structure or device on a plane perpendicular to the column direction or a plane perpendicular to a Y direction. Similarly, expressions such as "projection in the column direction", "projection in the Y direction", etc. mean a projection formed in the column direction or the Y direction by projecting a planar layer, element, component, structure or device on a plane formed by the row direction and the column direction (that is, XY plane); if considered in terms of a three-dimensional structure, the expressions mean a projection of a three-dimensional layer, element, component, structure or device on a plane perpendicular to the row direction or a plane perpendicular to the X direction.

The embodiments of the present disclosure provide a display panel and a display device. The display panel may include a first substrate and a second substrate arranged opposite to the first substrate. The first substrate includes a first base substrate and a plurality of spacers arranged on the first base substrate. The second substrate includes: a second base substrate; a plurality of gate lines and a plurality of data lines arranged on the second base substrate, wherein each of the gate lines is arranged in a row direction and each of the data lines is arranged in a column direction; and a plurality of sub-pixels arranged on the second base substrate in an array in the row direction and the column direction. The plurality of gate lines and the plurality of data lines intersect to define the plurality of sub-pixels. Each of the sub-pixels includes a light transmission region. The plurality of spacers includes at least one first spacer, the plurality of data lines includes at least a first data line, the plurality of sub-pixels include a first sub-pixel, and the first data line is arranged adjacent to the first sub-pixel. An orthographic projection of the first spacer on the second base substrate is adjacent to an orthographic projection of the light transmission region of the first sub-pixel on the second base substrate, and the orthographic projection of the first spacer on the second base substrate is spaced apart from an orthographic projection of the first data line on the second base substrate. The first data line includes a body portion and a bending portion, a projection of the bending portion in the column direction at least partially overlaps a projection of the first spacer in the column direction, and an orthographic projection of the bending portion on the second base substrate is bent toward a direction away from the orthographic projection of the first spacer on the second base substrate with respect to an orthographic projection of the body portion on the second base substrate. In the embodiments of the present disclosure, the data line close to the spacer is designed to be bent at a position corresponding to the first spacer, so that a sufficient arrangement space or sliding space may be provided for the spacer.

FIG. 1 shows a schematic cross-sectional view of a display panel according to some exemplary embodiments of the present disclosure. For example, the display panel may be a liquid crystal display panel. As shown in FIG. 1, the liquid crystal display panel includes a first substrate 1, a second substrate 2 arranged in cell alignment with the first substrate 1, and a liquid crystal molecular layer 3 arranged between the first substrate 1 and the second substrate 2. The liquid crystal display panel further includes at least an alignment film 4 arranged on a side of the second substrate 2 facing the first substrate 1 and a spacer 5 arranged on the first substrate 1 or the second substrate 2. It should be understood that an alignment film is further provided on a side of the first substrate 1 facing the second substrate 2. For example, as shown in FIG. 1, the spacer 5 may be arranged on the first substrate 1. The alignment film 4 may induce an alignment of liquid crystal molecules in the liquid crystal molecular layer 3. For example, an orientating channel may be formed on a surface of the alignment film 4 through a rubbing process, so as to induce the alignment of the liquid crystal molecules in the liquid crystal molecular layer 3. When the liquid crystal display panel displays a dark state, the liquid crystal molecules in the liquid crystal molecule layer 3 are not deflected, and light may fail to pass through the liquid crystal display panel. When the liquid crystal display panel displays a bright state, the liquid crystal molecules in the liquid crystal molecule layer 3 are deflected under an action of an electric field, and light may pass through the liquid crystal display panel. In addition, with a function of a color filter pattern provided on the first substrate or the second substrate, the liquid crystal display panel may further display a light having a color corresponding to the color filter pattern.

It should be noted that the spacer in the liquid crystal display panel plays a role in maintaining and ensuring a uniformity of a cell gap of the liquid crystal cell at various positions, so as to keep the cell gap of the liquid crystal display panel stable and uniform.

It should also be noted that a black matrix 12 and a color filter layer are provided on the first substrate 1. An orthographic projection of the spacer 5 on the first substrate 1 falls within an orthographic projection of the black matrix 12 on the first substrate 1. In an aspect, a size of the spacer 5 may not be set too small. For example, when the orthographic projection of the spacer 5 on the first substrate 1 is a circle, the size here may refer to a diameter of the circle; while when the orthographic projection of the spacer 5 on the first substrate 1 is a rectangle, the size here may refer to a length and a width of the rectangle. Therefore, it may be ensured that a supporting area of the spacer 5 is large enough to provide a sufficient supporting force. In another aspect, as the spacer 5 needs to fall within a range of the black matrix 12, the spacer also restricts an aperture ratio of the liquid crystal display panel to a certain extent. That is, the size of the spacer 5 may not be set too large to reduce the aperture ratio of the display panel. In an example, for a display panel with a resolution of 8K, the orthographic projection of the spacer 5 on the first substrate 1 may have a circular shape, and the diameter of the spacer 5 is in a range of 15 microns to 30 microns, for example, about 20 microns.

In the following drawings, in order to clearly show a relative positional relationship of various film layers included in the display panel, the alignment film, the color filter layer and the black matrix described above may be omitted, but this should not be understood as a limitation to the embodiments of the present disclosure.

Figure 2:
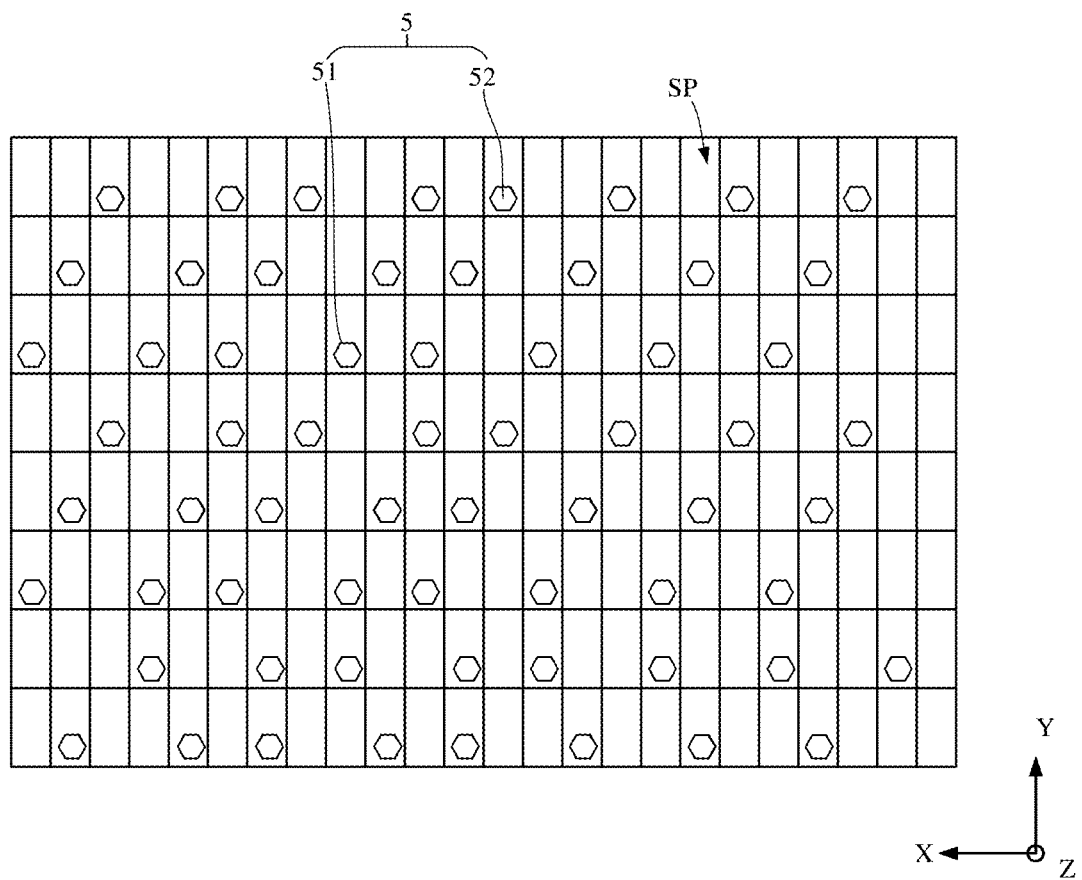
FIG. 2 schematically shows a schematic plan view of a distribution of spacers on a display panel according to the embodiments of the present disclosure.

FIG. 2 schematically shows a schematic plan view of a distribution of spacers on a display panel according to the embodiments of the present disclosure.

Referring to FIG. 1 and FIG. 2 in combination, a plurality of spacers 5 may include a plurality of main spacers (Main PS) 51 and a plurality of sub spacers (Sub PS) 52. It should be noted that in the schematic plan view of FIG. 2, the spacer 5 (including the main spacer 51 and the sub spacer 52) is represented by a "hexagon", but this does not mean a limitation to a shape of the main spacer and the sub spacer. The main spacer and the sub spacer may have various shapes of spacers known in the art, which will not be described in detail here. For example, the shape of the spacer 5 shown in the schematic plan view of FIG. 2 may be a circle, an ellipse, a rectangle, a rounded rectangle, or the like.

For example, a height of the main spacer 51 is greater than a height of the sub spacer 52. For example, the height of the sub spacer 52 may be 70% to 95% of the height of the main spacer 51. In a case of a normal cell-alignment of the first substrate 1 and the second substrate 2, the main spacer 51 plays a supporting role. When the display panel is pressed by a large external force, the sub spacer 52 may also play a supporting role to improve a pressure resistance. Moreover, when the pressing is eliminated, a restoring force may be provided by the main spacer and the sub spacer. By providing the main spacer and the sub spacer with different heights, a support ability of the spacer may be improved, and an occurrence of various Mura or defects may be prevented.

Figure 3:
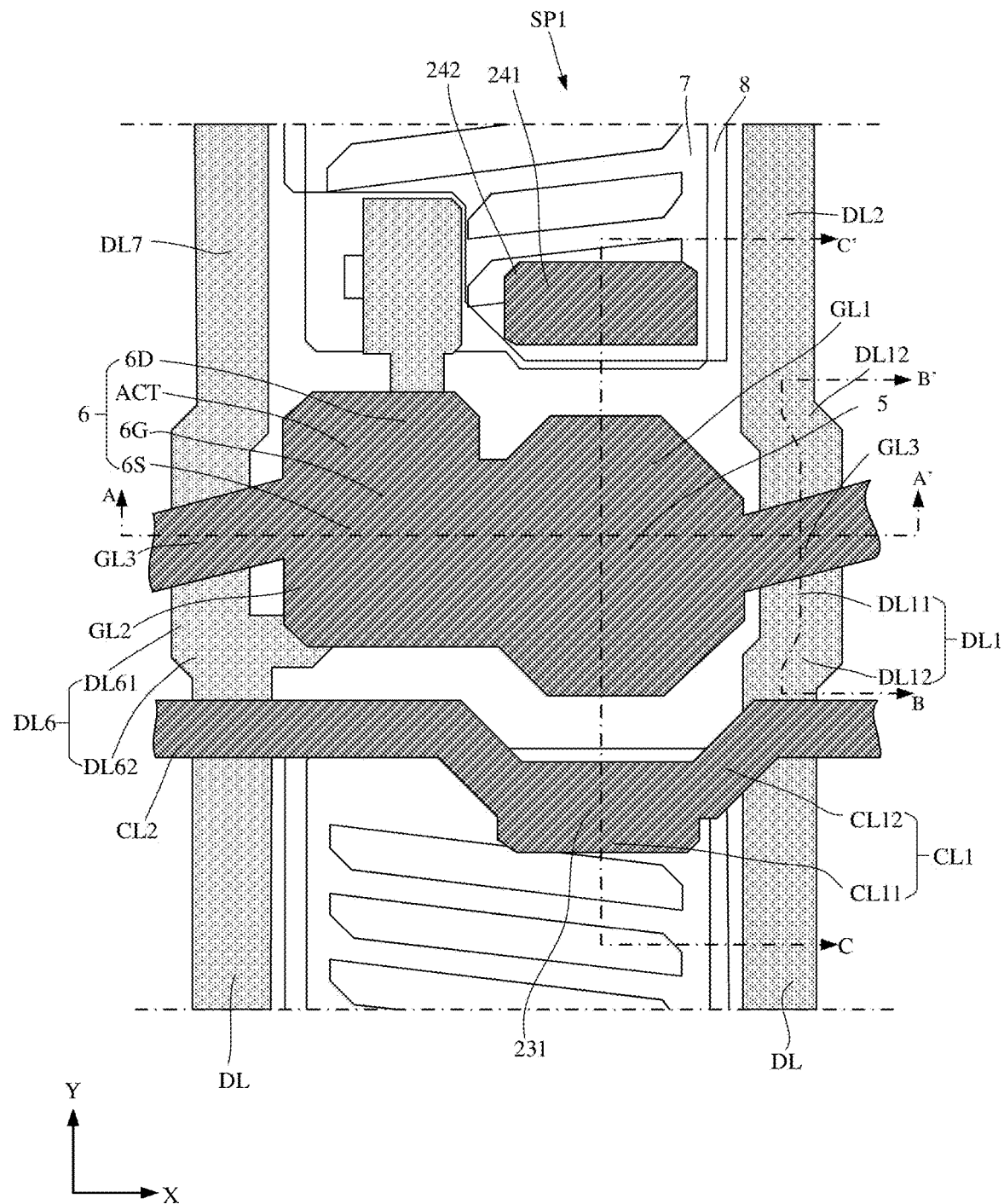
FIG. 3 shows a partial plan view of a display panel according to some exemplary embodiments of the present disclosure, in which a planar structure between two adjacent sub-pixels located in the same column is schematically shown.
Figure 4:
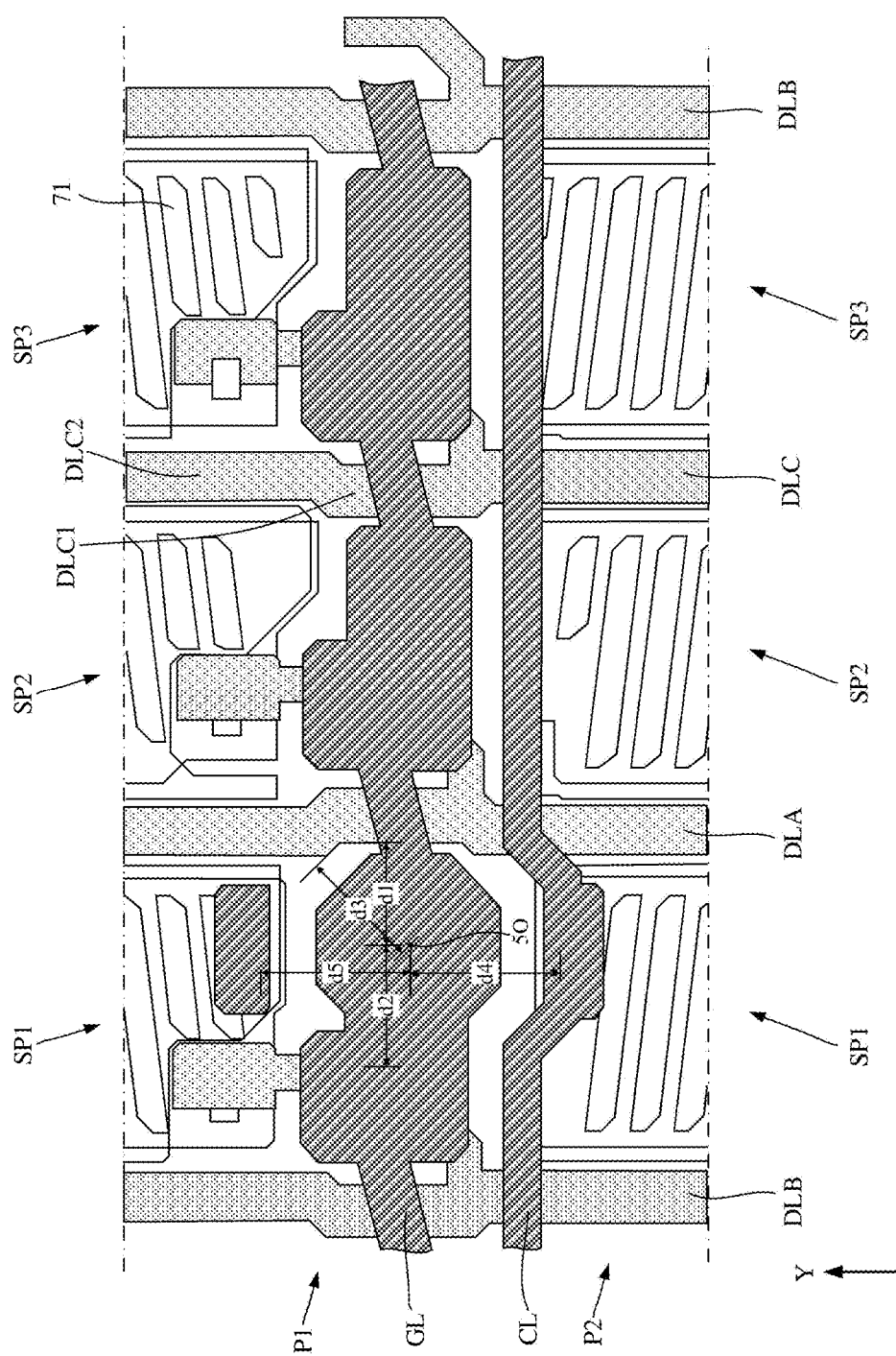
FIG. 4 shows a partial plan view of a display panel according to some exemplary embodiments of the present disclosure, in which a plurality of columns of sub-pixels are schematically shown.
Figure 5:
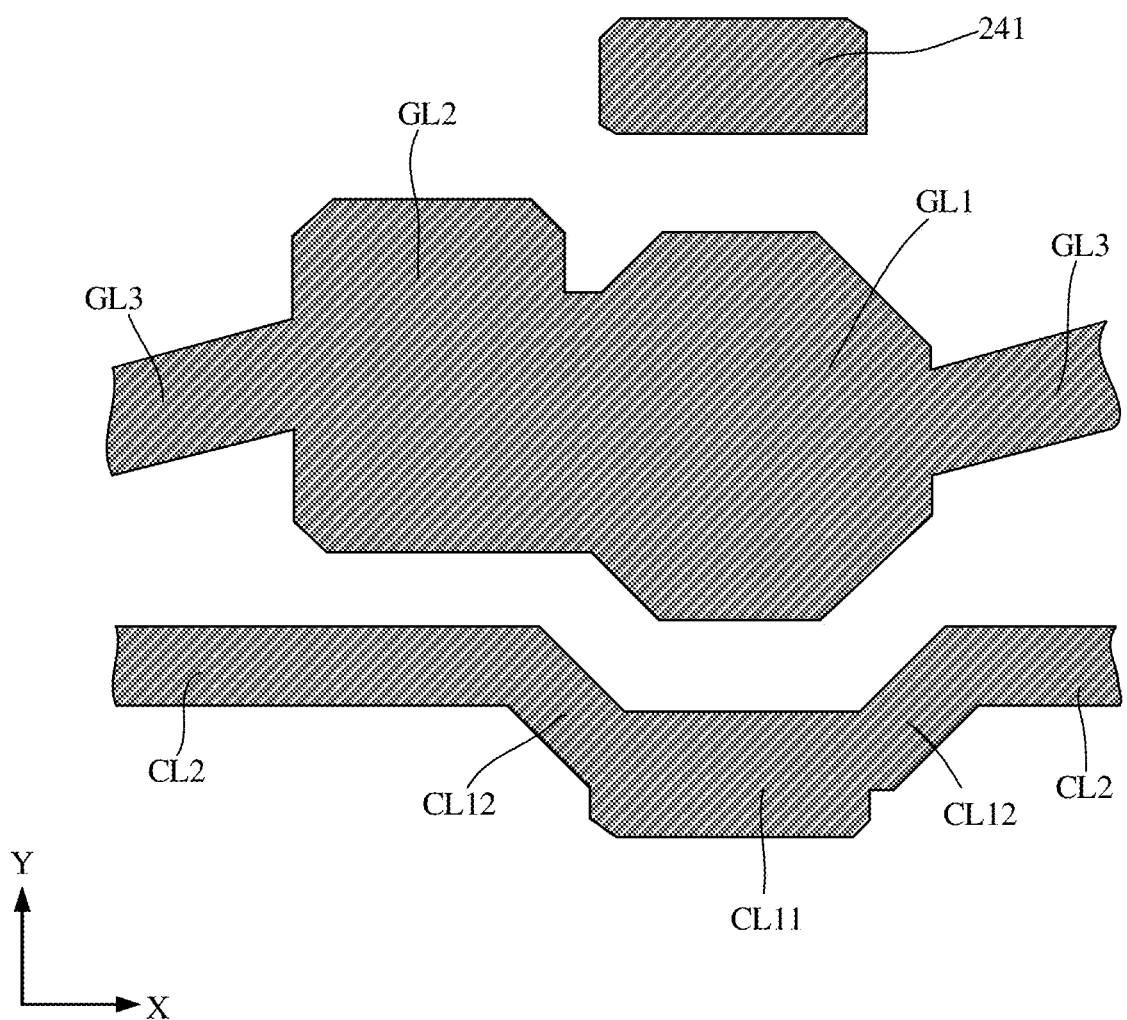
FIG. 5 shows a plan view of a first conductive layer included in the display panel of FIG. 3.
Figure 6:
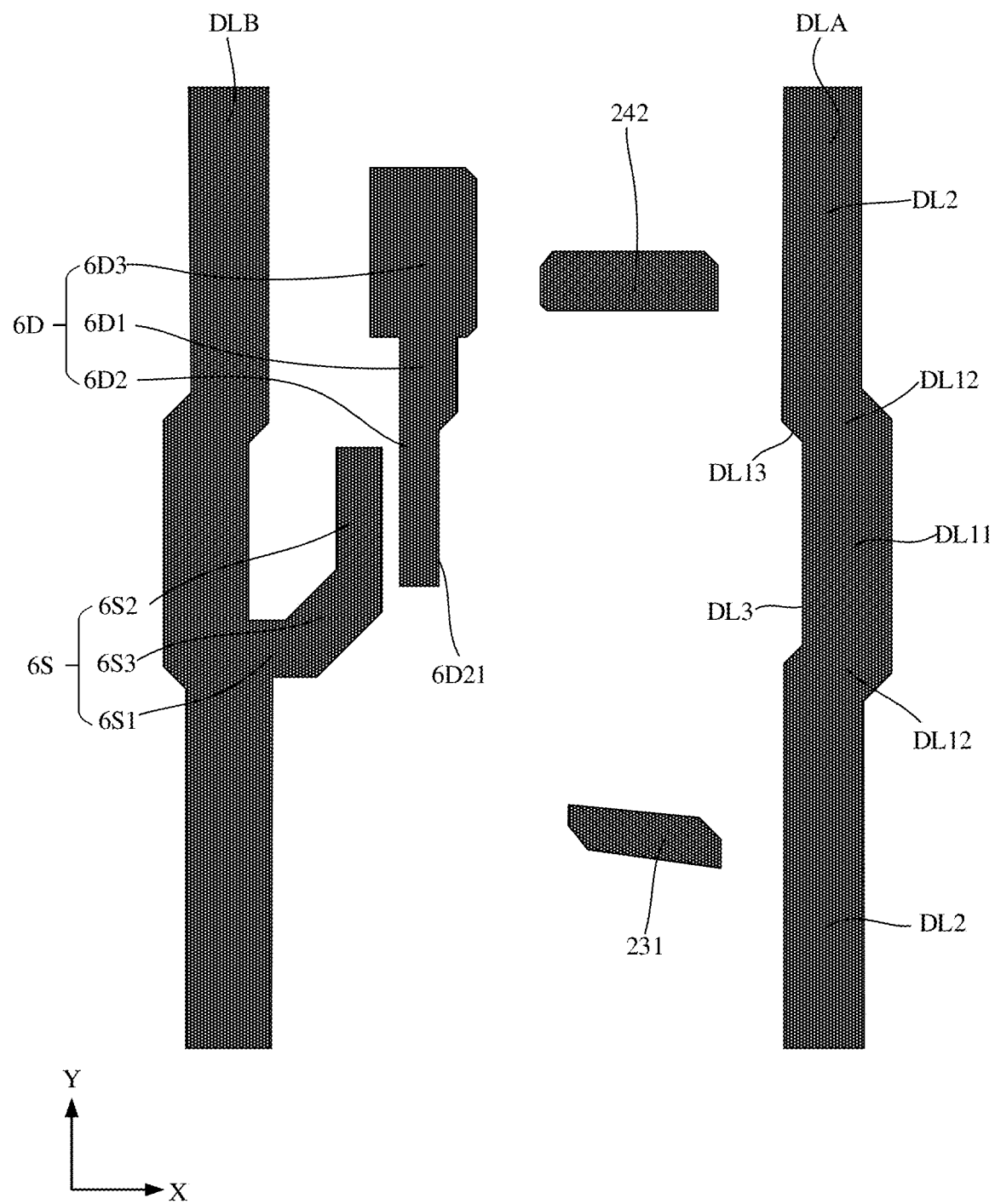
FIG. 6 shows a plan view of a second conductive layer included in the display panel of FIG. 3.
Figure 7:
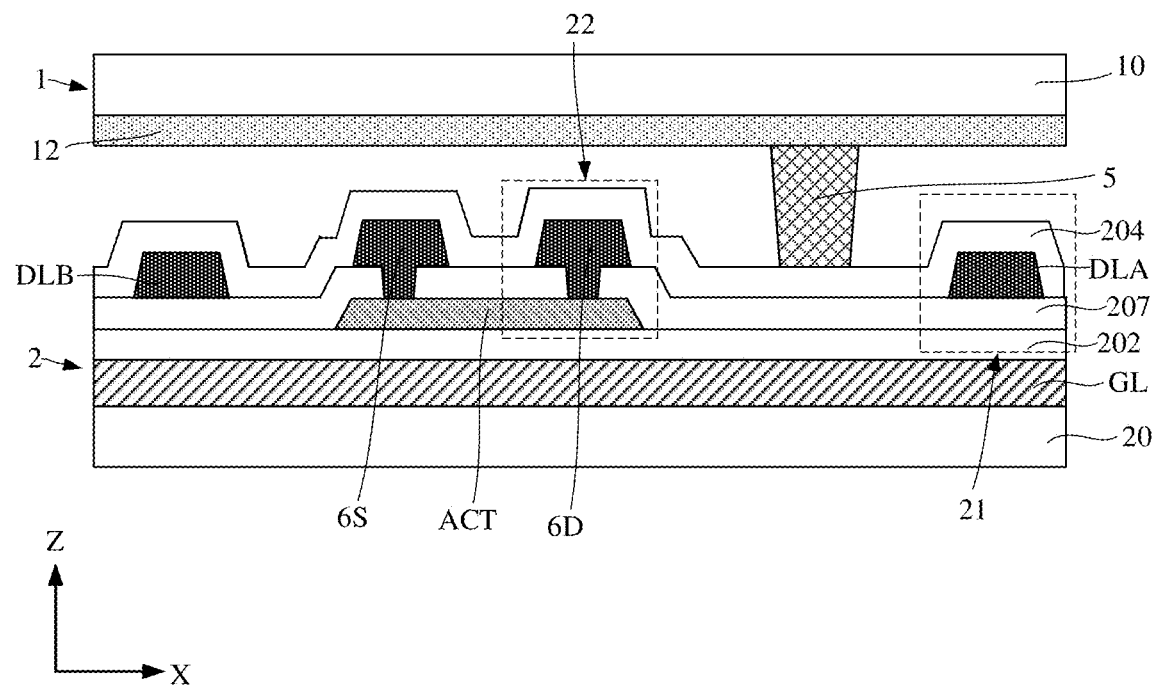
FIG. 7 shows a cross-sectional view taken along line AA' in FIG. 3.
Figure 8:
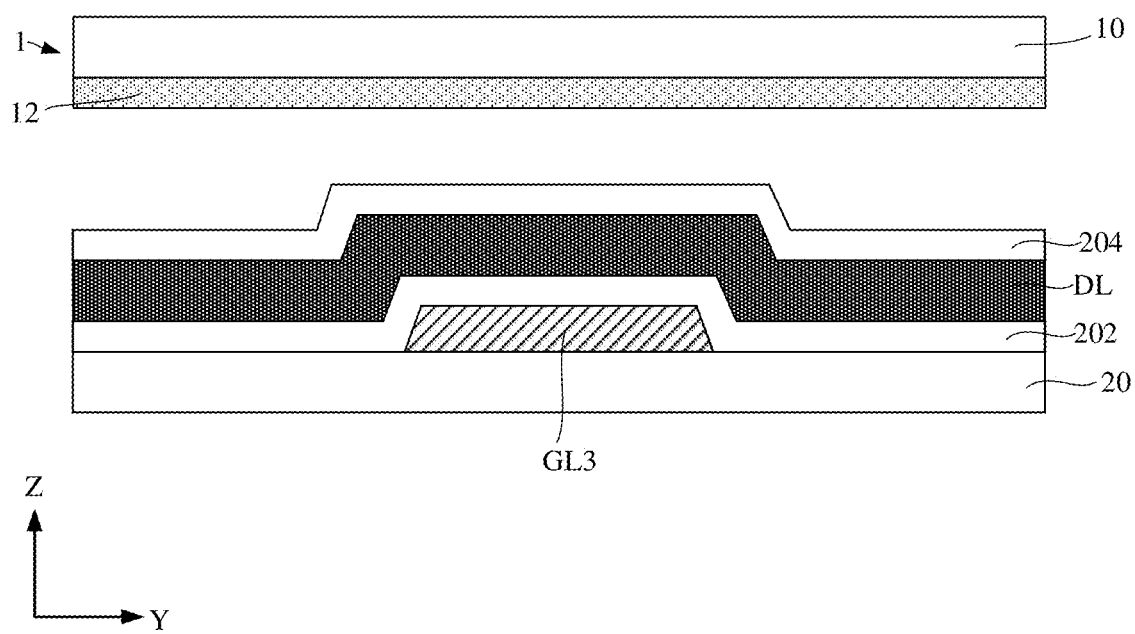
FIG. 8 shows a cross-sectional view taken along line BB' in FIG. 3.
Figure 9:
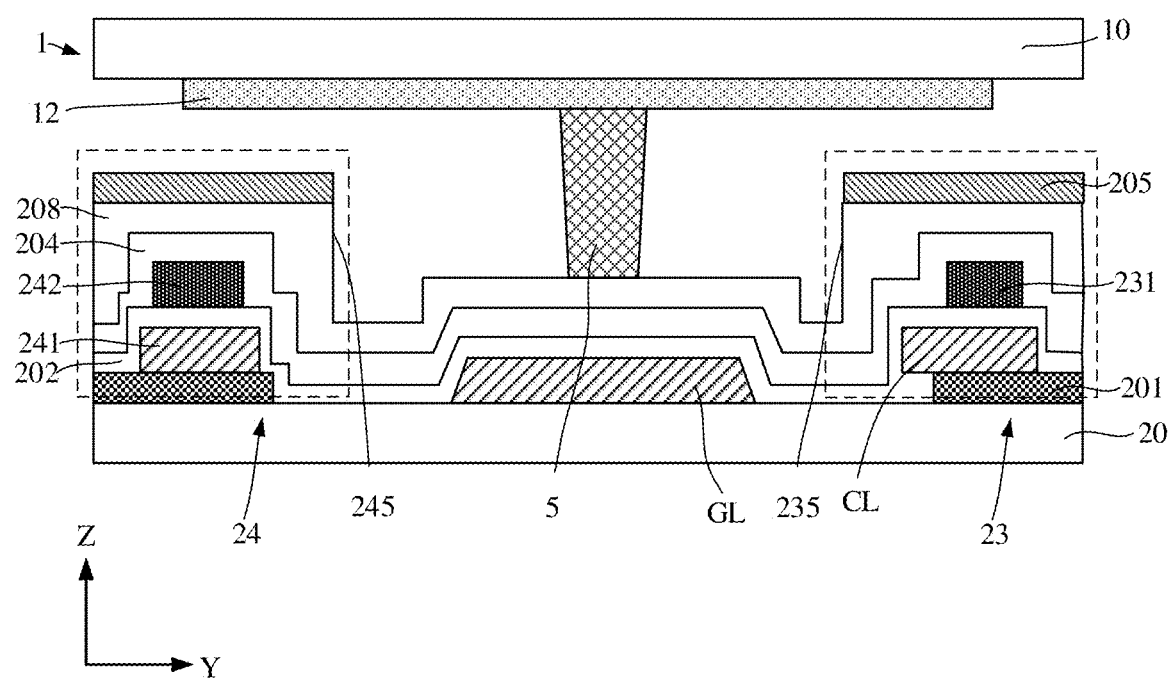
FIG. 9 shows a cross-sectional view taken along line CC' in FIG. 3.
Figure 10:
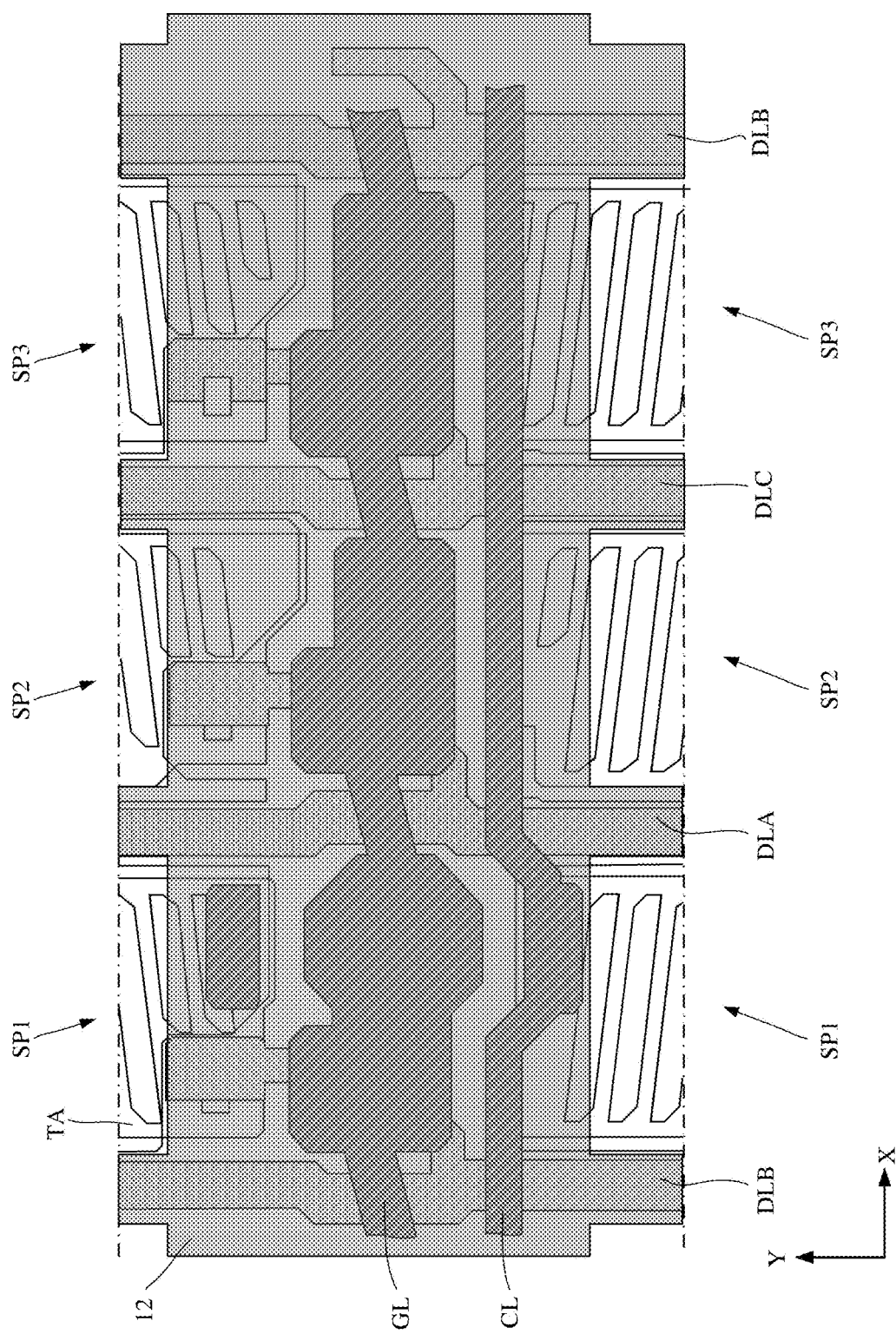
FIG. 10 shows a partial plan view of a display panel according to some exemplary embodiments of the present disclosure, in which a relative positional relationship between a black matrix on the first substrate and a film layer structure on the second substrate is schematically shown.

FIG. 3 shows a partial plan view of the display panel according to some exemplary embodiments of the present disclosure, in which a planar structure between two adjacent sub-pixels located in the same column is schematically shown. FIG. 4 shows a partial plan view of the display panel according to some exemplary embodiments of the present disclosure, in which a plurality of columns of sub-pixels are schematically shown. It should be noted that, in the plan views of FIG. 3 and FIG. 4, in order to clearly show a relative positional relationship between the spacer on the first substrate and the film layer structure on the second substrate, some film layer structures (e.g., the black matrix) formed on the first substrate are omitted. FIG. 5 shows a plan view of a first conductive layer included in the display panel of FIG. 3. FIG. 6 shows a plan view of a second conductive layer included in the display panel of FIG. 3. FIG. 7 shows a cross-sectional view taken along line AN in FIG. 3. FIG. 8 shows a cross-sectional view taken along line BB' in FIG. 3. FIG. 9 shows a cross-sectional view taken along line CC' in FIG. 3. FIG. 10 shows a partial plan view of a display panel according to some exemplary embodiments of the present disclosure, in which a relative positional relationship of a black matrix on a first substrate and a film layer structure on a second substrate is schematically shown.

Referring to FIG. 2, FIG. 3 and FIG. 4, the display panel may include a plurality of sub-pixels SP arranged in an array. The plurality of sub-pixels SP are arranged in a row direction (X direction shown in figures) and a column direction (Y direction shown in figures). The plurality of sub-pixels SP may include at least a first sub-pixel SP1, a second sub-pixel SP2 and a third sub-pixel SP3. For example, the first sub-pixel, the second sub-pixel and the third sub-pixel may be a red sub-pixel, a green sub-pixel and a blue sub-pixel, respectively. For example, the first sub-pixel, the second sub-pixel and the third sub-pixel may constitute a pixel. For example, for a display panel with a resolution of 8K, 7680*4320 pixels are provided. However, the embodiments of the present disclosure are not limited thereto, and the first sub-pixel, the second sub-pixel and the third sub-pixel may be sub-pixels having other colors.

The plurality of spacers 5 are respectively provided in the plurality of sub-pixels SP. For example, each sub-pixel SP may be provided with at most one spacer 5 (one of the main spacer 51 and the sub spacer 52).

For example, the display panel includes the plurality of main spacers 51 and the plurality of sub spacers 52. The number of main spacers 51 may be less than the number of sub spacers 52. For example, in the example shown in FIG. 2, eight rows and twenty-four columns of sub-pixels SP (i.e., 192 sub-pixels SP) are shown, and sixty-four spacers 5 specifically including four main spacers 51 and sixty sub spacers 52 are provided. Such an arrangement may ensure a good supporting effect of the spacer on the liquid crystal cell.

It should be noted that, in the embodiments of FIG. 2, the spacer is not provided for each sub-pixel, but for some of the sub-pixels. However, the embodiments of the present disclosure are not limited to this. In other embodiments, according to an actual desire of a distribution density, one sub-pixel may be provided with a plurality of spacers, or each sub-pixel may be provided with one spacer. For another example, in some exemplary embodiments, no spacer is provided in a sub-pixel adjacent to the sub-pixel where the main spacer 51 is located.

It should also be noted that the display panel according to the embodiments of the present disclosure is particularly suitable for an ADS (Advanced Super Dimension Switch) mode, and the embodiments described herein are also described by taking an ADS mode display panel as an example. However, the embodiments of the present disclosure are not limited thereto and may also be applied to display devices of various other modes, such as TN (Twisted Nematic) mode, VA (Vertical Alignment) mode, etc. In addition, the display panel may be a touch display panel.

Optionally, the first substrate 1 may be a color filter substrate, and the second substrate 2 may be an array substrate.

Referring to FIG. 3 to FIG. 10 in combination, the first substrate 1 may include a first base substrate 10 and a black matrix 12 arranged on the first base substrate 10. Each spacer 5 (each of the main spacer 51 and the sub spacer 52) is located on the first base substrate 10, and an orthographic projection of the spacer 5 on the first base substrate 10 falls within an orthographic projection of the black matrix 12 on the first base substrate 10.

The second substrate 2 may include a second base substrate 20, and a gate line GL, a common electrode line CL and a data line DL arranged on the second base substrate 20. The gate line GL and the common electrode line CL are arranged in the row X direction, and the data line DL is arranged in the column Y direction. The gate line GL and the data line DL intersect to define the plurality of sub-pixels SP. Each sub-pixel SP includes a light transmission region TA, from which light may exit the display panel, so that a display function may be achieved. It should be understood that an orthographic projection of the light transmission region TA of each sub-pixel SP on the second base substrate 20 does not overlap the orthographic projection of the black matrix 12 on the second base substrate 20. An orthographic projection of each spacer 5 on the second base substrate 20, an orthographic projection of various signal lines including the gate line GL, the common electrode line CL and the data line DL on the second base substrate 20, and an orthographic projection of various thin film transistors for driving the sub-pixels on the second base substrate 20 fall within the orthographic projection of the black matrix 12 on the second base substrate 20.

Referring to FIG. 3 and FIG. 4, a partial plane structure of pixels in two adjacent rows and an opaque region between the two adjacent rows of pixels are schematically shown, in which, FIG. 3 only shows one column of sub-pixels. For convenience of description, the two adjacent rows of pixels may be respectively referred to as a first row of pixels (an upper row of pixels shown in FIG. 4) P1 and a second row of pixels (a lower row of pixels shown in FIG. 4) P2. In an example, each row of pixels may include a plurality of pixels arranged in the row X direction, and each pixel may include a first sub-pixel SP1, a second sub-pixel SP2 and a third sub-pixel SP3 sequentially arranged in the row X direction. For example, the first sub-pixel SP1, the second sub-pixel SP2 and the third sub-pixel SP3 may be a red sub-pixel, a green sub-pixel and a blue sub-pixel, respectively. Similarly, each of the first sub-pixel SP1, the second sub-pixel SP2 and the third sub-pixel SP3 includes a light transmission region TA.

In the opaque region (which is blocked by the black matrix 12) between the first row of pixels P1 and the second row of pixels P2, a gate line GL and a common electrode line CL are arranged in the row X direction, and the gate line GL and the common electrode line CL are spaced apart from each other in the column Y direction. The gate line GL is used to provide a gate scan signal to each sub-pixel SP in the first row of pixels P1. The common electrode line CL is electrically connected to a common electrode of each sub-pixel in the first row of sub-pixels and the second row of sub-pixels. For example, the common electrode line CL may include a plurality of portions extending toward the first row of sub-pixels, and an orthographic projection of the plurality of portions on the second base substrate may at least partially overlap an orthographic projection of the common electrode of each sub-pixel in the first row of sub-pixels, so that the plurality of portions may be electrically connected to the common electrode of each sub-pixel in the first row of sub-pixels through a via hole.

As shown in FIG. 3, data lines DL are respectively provided on both sides of the first sub-pixel SP1 in the X direction. For convenience of description, the data line on a right side of the first sub-pixel SP1 is referred to as a first data line DLA, and the data line on a left side of the first sub-pixel SP1 is referred to as a second data line DLB. The gate line GL and the common electrode line CL are arranged in sequence on a lower side of the first sub-pixel SP1 in the Y direction. For the convenience of description, the gate line GL for providing the gate scan signal to the first sub-pixel SP1 is referred to as a first gate line GL1, and the common electrode line arranged adjacent to the first gate line GL1 is referred to as a first common electrode line CL. It should be understood that this is only for the convenience of description and should not be construed as a limitation on the data line, the gate line and the common electrode line. Except for a slight difference at a bending design (which will be described in detail below), the first data line DLA and the second data line DLB have the same structure at other positions.

Referring to FIG. 3, a spacer 5 in the opaque region between the first row of pixels P1 and the second row of pixels P2 is schematically shown. It should be noted that the spacer 5 may be a main spacer 51 or a sub spacer 52. In other words, in the embodiments shown in FIG. 3, the spacer 5 is arranged in the first sub-pixel SP1. Herein, the expression "the spacer is arranged in the sub-pixel" or "the sub-pixel where the spacer is located" means that an orthographic projection of the spacer on the base substrate overlaps or falls within an orthographic projection of the sub-pixel on the base substrate. In other words, the orthographic projection of the spacer on the base substrate at least partially overlaps an orthographic projection of an opaque region adjacent to the light transmission region of the sub-pixel on the base substrate. More specifically, the spacer 5 is arranged in one first sub-pixel SP1 in the first row of pixels P1, which means that the spacer 5 is arranged at an edge position of the first sub-pixel SP1, close to the second row of pixels P2, in the first row of pixels P1. In other words, the orthographic projection of the spacer 5 on the base substrate at least partially overlaps the orthographic projection of the opaque region of the first sub-pixel SP1 on the base substrate.

Continuing to refer to FIG. 3, the first gate line GL may include a first widened portion GL1 and a second widened portion GL2. In a direction parallel to an arrangement direction of the data line DL (that is, the Y direction shown in the figure), the first widened portion GL1 and the second widened portion GL2 have a large size, which is greater than a size of a portion of the first gate line GL other than the first widened portion GL1 and the second widened portion GL2. For example, an orthographic projection of the first widened portion GL1 on the second base substrate 20 may have an approximately polygonal shape (e.g., an octagon or a regular octagon), and an orthographic projection of the second widened portion GL2 on the second base substrate 20 may have an approximately rectangular shape (e.g., a rounded rectangle). It should be understood that these shapes are not limitations to the embodiments of the present disclosure, and the first widened portion GL1 and the second widened portion GL2 may also have other suitable shapes.

For another example, the orthographic projection of the spacer 5 on the second base substrate 20 may have an approximately polygonal shape (e.g., an octagon or a regular octagon). It should be understood that these shapes are not limitations to the embodiments of the present disclosure, and the spacer 5 may also have other suitable shapes.

It should be noted that the spacer includes an upper surface facing the first base substrate and a lower surface away from the first base substrate. An area of the upper surface of the spacer may be greater than an area of the lower surface of the spacer, that is, a cross section of the spacer has a trapezoidal shape. In the present disclosure, the orthographic projection of the spacer on the first base substrate or the second base substrate may refer to an orthographic projection of the upper surface (that is, the surface with a larger area) of the spacer on the first base substrate or the second base substrate.

In the embodiments of the present disclosure, an orthographic projection of a spacer 5 (which may be referred to as a first spacer herein for convenience of description) on the second base substrate 20 falls within an orthographic projection of the first gate line GL on the second base substrate 20. Specifically, the orthographic projection of the first spacer 5 on the second base substrate 20 falls within an orthographic projection of the first widened portion GL1 of the first gate line GL on the second base substrate 20. Such an arrangement may ensure that the spacer supports at a position corresponding to the gate line, so as to avoid scratching the alignment film. Further, a distance between the spacer and the light transmission region of each adjacent sub-pixel may be maximized, so as to avoid scratching the alignment film.

The second substrate 2 may further include a thin film transistor 6 arranged on the second base substrate 20. The thin film transistor 6 may include an active layer ACT, a gate electrode 6G, a first electrode 6S (e.g., one of source and drain electrodes), and a second electrode 6D (e.g., the other of the source and drain electrodes). Herein, for the convenience of description, the thin film transistor 6 may also be referred to as a first transistor.

An orthographic projection of the thin film transistor 6 on the second base substrate 20 at least partially overlaps the orthographic projection of the first gate line GL on the second base substrate 20. For example, the orthographic projection of the thin film transistor 6 on the second base substrate 20 at least partially overlaps an orthographic projection of the second widened portion GL2 of the first gate line GL on the second base substrate 20. In an example, a portion of the first gate line GL forms the gate electrode 6G of the thin film transistor 6. An orthographic projection of a portion of the first gate line GL on the second base substrate 20 coincides with an orthographic projection of the active layer ACT of the thin film transistor 6 on the second base substrate 20. For example, an orthographic projection of a portion of the second widened portion GL2 of the first gate line GL on the second base substrate 20 coincides with the orthographic projection of the active layer ACT of the thin film transistor 6 on the second base substrate 20. In this way, the portion of the gate line GL forms the gate electrode 6G of the thin film transistor 6.

In the present disclosure, for the convenience of description, a layer where the gate line GL is located is referred to as a first conductive layer, and a layer where the data line DL is located is referred to as a second conductive layer. It should be understood that the first conductive layer and the second conductive layer are different layers. For example, the second conductive layer is arranged on a side of the first conductive layer away from the second base substrate 20. The common electrode line CL may be located in the first conductive layer. The first electrode 6S and the second electrode 6D of the thin film transistor may be located in the second conductive layer.

The first electrode 6S of the thin film transistor 6 may be electrically connected to a left data line DL (that is, the second data line DLB), and the second electrode 6D may be electrically connected to a pixel electrode 7 (which will be described in detail below).

With such a connection, the data signal supplied by the data line DL (for example, the second data line) may be transmitted to the pixel electrode 7 under a control of the gate scan signal supplied by the first gate line GL, so as to generate an electric field for controlling the liquid crystal molecules.

Continuing to refer to FIG. 3, in the X direction, the orthographic projection of the first spacer 5 on the second base substrate 20 is located between an orthographic projection of the thin film transistor 6 on the second base substrate 20 and an orthographic projection of the right data line DL on the second base substrate 20. That is, the orthographic projection of the first widened portion GL1 on the second base substrate 20 is located between the orthographic projection of the second widened portion GL2 on the second base substrate 20 and the orthographic projection of the right data line DL on the second base substrate 20.

The right data line DL (that is, the first data line DLA) includes a bending portion DL1. That is, the first data line DLA does not extend straight in the Y direction, but includes the bending portion DL1 at a position corresponding to the spacer 5. Specifically, a projection of the spacer 5 in the Y direction falls within a projection of the bending portion DL1 in the Y direction. A projection of the first widened portion GL1 in the Y direction at least partially overlaps the projection of the bending portion DL1 in the Y direction.

Specifically, the first data line DLA includes a body portion DL2 and a bending portion DL1. In the X direction, the bending portion DL1 is farther away from the first spacer 5 or the first widened portion GL1 than the body portion DL2. In other words, in the plan view shown in FIG. 3, an orthographic projection of the bending portion DL1 on the second base substrate 20 is farther from the orthographic projection of the first spacer 5 or the first widened portion GL1 on the second base substrate 20 than an orthographic projection of the body portion DL2 on the second base substrate 20. That is, in the plan view shown in FIG. 3, a distance between the orthographic projection of the bending portion DL1 on the second base substrate 20 and the orthographic projection of the first spacer 5 or the first widened portion GL1 on the second base substrate 20 in the X direction is greater than a distance between the orthographic projection of the body portion DL2 on the second base substrate 20 and the orthographic projection of the first spacer 5 or the first widened portion GL1 on the second base substrate 20 in the X direction.

More specifically, the bending portion DL1 includes a bending body portion DL11 and two bending connection portions DL12. The bending body portion DL11 extends straight in the Y direction. The two bending connection portions DL12 are respectively located at both ends of the bending body portion DL11, the bending connection portion DL12 at one end is connected to one section of the body portion DL2, and the bending connection portion DL12 at the other end is connected to the other section of the body portion DL2.

It should be noted that, although the data line DL is described by different portions (e.g., the body portion DL2, the bending portion DL1, the bending body portion DL11, the bending connection portion DL12), it should be understood that these portions (e.g., the body portion DL2, the bending portion DL1, the bending body portion DL11, the bending connection portion DL12) are formed as a continuously extending integral structure. That is, the data line DL is a continuously extending structure, rather than being arranged in sections.

For example, an angle between an arrangement direction of each bending connection portion DL12 and the X direction or the Y direction may be about 45 degrees. It should be understood that the embodiments of the present disclosure are not limited thereto, and the angle may also be other angles, such as 30 degrees, 60 degrees, etc.

In the embodiments of the present disclosure, the data line DL (that is, the first data line DLA) close to the first spacer 5 is designed to be bent at the position corresponding to the first spacer 5, so that the first spacer 5 may be provided with a sufficient arrangement space or sliding space. Specifically, the spacer 5 is arranged on the first substrate 1. During a cell alignment of the first substrate 1 and the second substrate 2, due to a limitation of an accuracy of the cell alignment, there may be a deviation in the cell alignment between the first substrate 1 and the second substrate 2. With the bending design, even in a case that a deviation is caused during the cell alignment, the spacer 5 may still be prevented from abutting on the data line, so as to ensure that the spacer 5 provides a good support to the second substrate. In addition, when the display panel is pressed, a relative displacement between the first substrate 1 and the second substrate 2 may be caused. With the bending design, a sufficient sliding space is provided for the spacer 5, which may prevent the spacer 5 from touching the data line.

It should also be noted that, in the embodiments of the present disclosure, a portion at positions on the second substrate where the data line, the source and drain electrodes of the thin film transistor and so on are arranged may have a height greater than that of a portion at other positions, that is, a bump may be formed at the positions on the second substrate where the data line, the source and drain electrodes of the thin film transistor and so on are arranged. With the bending design, the spacer may be kept away from the bump as far as possible, so that the display panel may be prevented from having a greater cell gap at the position of the data line than other positions. In this way, a risk of generating a dark non-uniformity may be reduced. Moreover, due to the bending design for the data line, the size of the spacer 5 may be set relatively large to increase a contact area between the spacer 5 and the second substrate 2, so that a good supporting force may be provided for the second substrate 2 and a risk of black gap may be reduced.

Referring to FIG. 3 and FIG. 4 in combination, a bending design is further made to the data line DL (that is, the second data line DLB) on the left side of the first sub-pixel SP1. The second data line DLB is located on a side of the thin film transistor 6 away from the spacer 5. Specifically, in the X direction, an orthographic projection of the second data line DLB on the second base substrate 20 is located on a side of the orthographic projection of the thin film transistor 6 on the second base substrate 20 away from the orthographic projection of the spacer 5 on the second base substrate 20. In other words, in the X direction, a distance between the orthographic projection of the second data line DLB on the second base substrate 20 and the orthographic projection of the spacer 5 on the second base substrate 20 is greater than a distance between the orthographic projection of the thin film transistor 6 on the second base substrate 20 and the orthographic projection of the spacer 5 on the second base substrate 20.

Optionally, in the X direction, the distance between the orthographic projection of the second data line DLB on the second base substrate 20 and the orthographic projection of the first spacer 5 on the second base substrate 20 is greater than a distance between the orthographic projection of the first data line DLA on the second base substrate 20 and the orthographic projection of the first spacer 5 on the second base substrate 20.

The second data line DLB includes a bending portion DL6. That is, the second data line DLB does not extend straight in the Y direction, but includes a bending portion DL6 at a position corresponding to the first spacer 5. Specifically, a projection of the first spacer 5 in the Y direction falls within a projection of the bending portion DL6 in the Y direction. A projection of the first widened portion GL1 in the Y direction at least partially overlaps the projection of the bending portion DL6 in the Y direction. A projection of the second widened portion GL2 in the Y direction at least partially overlaps the projection of the bending portion DL6 in the Y direction.

Specifically, the second data line DLB includes a body portion DL7 and a bending portion DL6. In the X direction, the bending portion DL6 is farther away from the first spacer 5, the first widened portion GL1 or the second widened portion GL2 than the body portion DL7. In other words, in the plan view shown in FIG. 3, an orthographic projection of the bending portion DL6 on the second base substrate 20 is farther from the orthographic projection of the first spacer 5 or the first widened portion GL1 on the second base substrate 20 than an orthographic projection of the body portion DL7 on the second base substrate 20. That is, in the plan view shown in FIG. 3, a distance between the orthographic projection of the bending portion DL6 on the second base substrate 20 and the orthographic projection of the first spacer 5 or the first widened portion GL1 on the second base substrate 20 in the X direction is greater than a distance between the orthographic projection of the body portion DL7 on the second base substrate 20 and the orthographic projection of the first spacer 5 or the first widened portion GL1 on the second base substrate 20 in the X direction.

More specifically, the bending portion DL6 includes a bending body portion DL61 and two bending connection portions DL62. The bending body portion DL61 extends straight in the Y direction. The two bending connection portions DL62 are respectively located at both ends of the bending body portion DL61, the bending connection portion DL62 at one end is connected to one section of the body portion DL7, and the bending connection portion DL62 at the other end is connected to the other section of the body portion DL7.

It should be noted that, although the data line DL is described by different portions (e.g., the body portion DL7, the bending portion DL6, the bending body portion DL61, the bending connection portion DL62), it should be understood that these portions (e.g., the body portion DL7, the bending portion DL6, the bending body portion DL61, the bending connection portion DL62) are formed as a continuously extending integral structure. That is, the data line DL is a continuously extending structure, rather than being arranged in sections.

For example, an angle between an arrangement direction of each bending connection portion DL62 and the X direction or the Y direction may be about 45 degrees. It should be understood that the embodiments of the present disclosure are not limited thereto, and the angle may also be other angles, such as 30 degrees, 60 degrees, etc.

As shown in FIG. 3, the thin film transistor 6 is located between the second data line DLB and the spacer 5. Specifically, in the X direction, the orthographic projection of the thin film transistor 6 on the second base substrate 20 is located between the orthographic projection of the second data line DLB on the second base substrate 20 and the orthographic projection of the spacer 5 on the second base substrate 20. The second data line DLB is bent toward a left direction (that is, a direction away from the spacer 5) at a position corresponding to the spacer 5, and a distance between the second data line DLB and the thin film transistor 6 in the X direction is substantially unchanged, which is beneficial to fabricate the data line and the thin film transistor on the second base substrate 20. Therefore, the thin film transistor 6 is displaced to the left direction (that is, the direction away from the spacer 5) at the position corresponding to the spacer 5. As a result, the distance between the thin film transistor 6 and the spacer 5 is increased, so that a space for the spacer 5 to slide to the left is increased.

In other words, in the embodiments of the present disclosure, the data lines located on both sides of the first sub-pixel SP1 are respectively bent toward the direction away from the spacer 5 at the position corresponding to the spacer 5, so that the space in which the spacer 5 may slide toward both sides (e.g., left and right sides shown in FIG. 3) is increased. This is beneficial to reduce or even avoid a defect caused by an inaccurate cell alignment of the two substrates or the slide of the spacer.

FIG. 4 schematically shows a plurality of data lines located on both sides of a plurality of columns of sub-pixels. In some embodiments of the present disclosure, some of the sub-pixels may not be provided with the spacer. For example, in the embodiments shown in FIG. 4, no spacer 5 is provided in the second sub-pixel SP2 and the third sub-pixel SP3. The plurality of data lines may include a third data line DLC adjacent to the first data line DLA. The bending design may also be made to the third data line DLC.

Specifically, the third data line DLC includes a body portion DLC2 and a bending portion DLC1. That is, the third data line DLC does not extend straight in the Y direction, but includes a bending portion DLC1 at a position corresponding to the first spacer 5. Specifically, the projection of the first spacer 5 in the Y direction falls within a projection of the bending portion DLC1 in the Y direction. The projection of the first widened portion GL1 in the Y direction at least partially overlaps the projection of the bending portion DLC1 in the Y direction.

Optionally, a bending direction of the third data line DLC may be identical with a bending direction of the second data line DLB. As shown in FIG. 4, the bending portion DL6 of the second data line DLB is bent to the left, and the bending portion DLC1 of the third data line DLC is also bent to the left.

Optionally, the bending direction of the third data line DLC may be identical with a bending direction of the first data line DLA. That is, the bending portion DL1 of the first data line DLA is bent to the right, and the bending portion DLC1 of the third data line DLC is also bent to the right.

In the embodiments shown in FIG. 4, the first sub-pixel SP1, the second sub-pixel SP2 and the third sub-pixel SP3 are sequentially arranged in the X direction to form a pixel. A plurality of pixels are arranged in an array in the X direction and the Y direction. The data lines on both sides of the first sub-pixel SP1 include the second data line DLB and the first data line DLA, the data lines on both sides of the second sub-pixel SP2 include the first data line DLA and the third data line DLC, and the data lines on both sides of third sub-pixel SP3 include the third data line DLC and the second data line DLB. That is, the second data line DLB, the first data line DLA and the third data line DLC are sequentially arranged in the X direction. It should be understood that the embodiments of the present disclosure are not limited to such an arrangement of pixels, and when a pixel arrangement is changed, an arrangement of the data line, the gate line and the common electrode line may be changed accordingly.

Figure 11A:
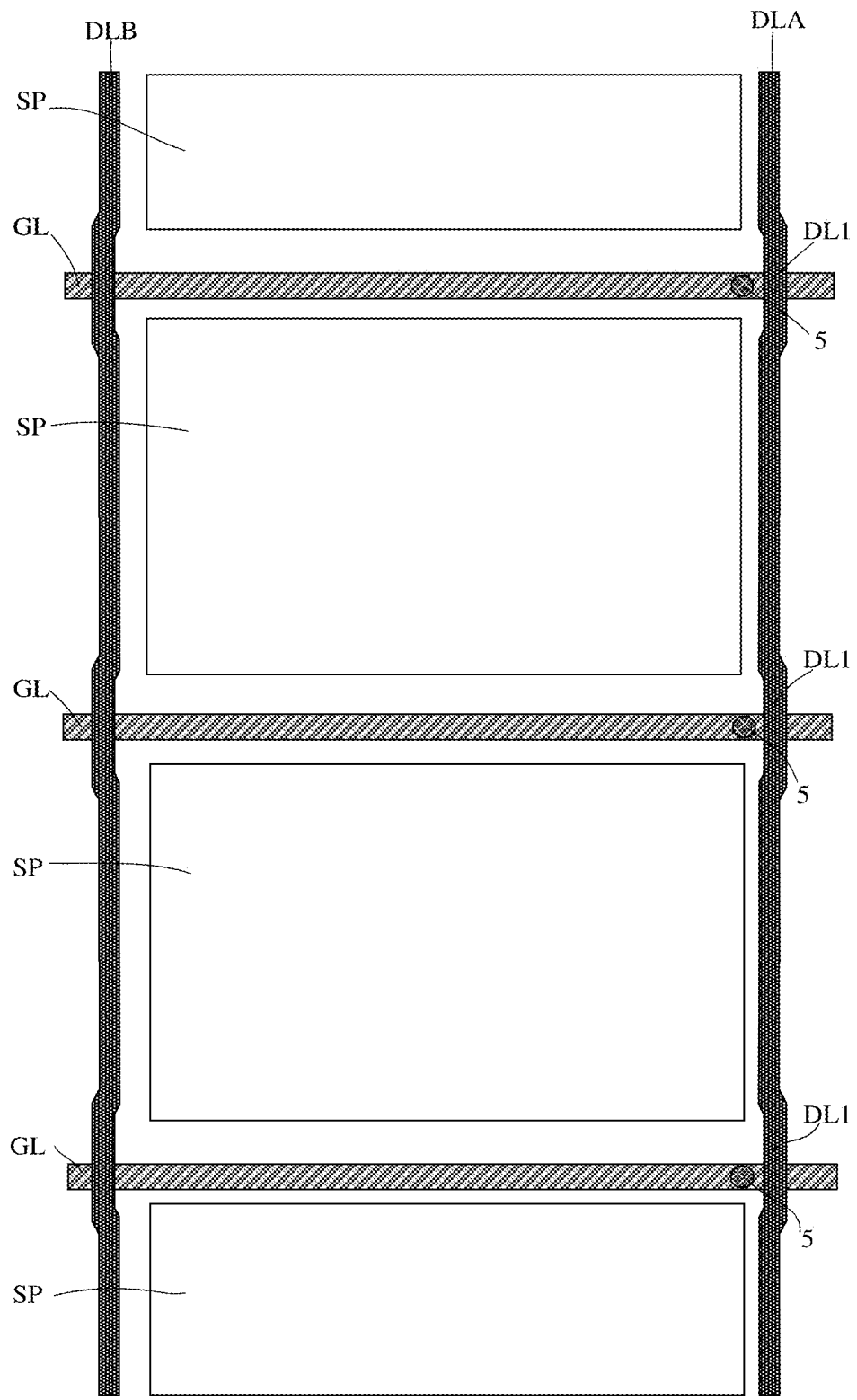
FIG. 11A and FIG. 11B respectively show partial plan views of a display panel according to some exemplary embodiments of the present disclosure, in which a plurality of rows of sub-pixels and a data line extending in the plurality of rows of sub-pixels are schematically shown.
Figure 11B:
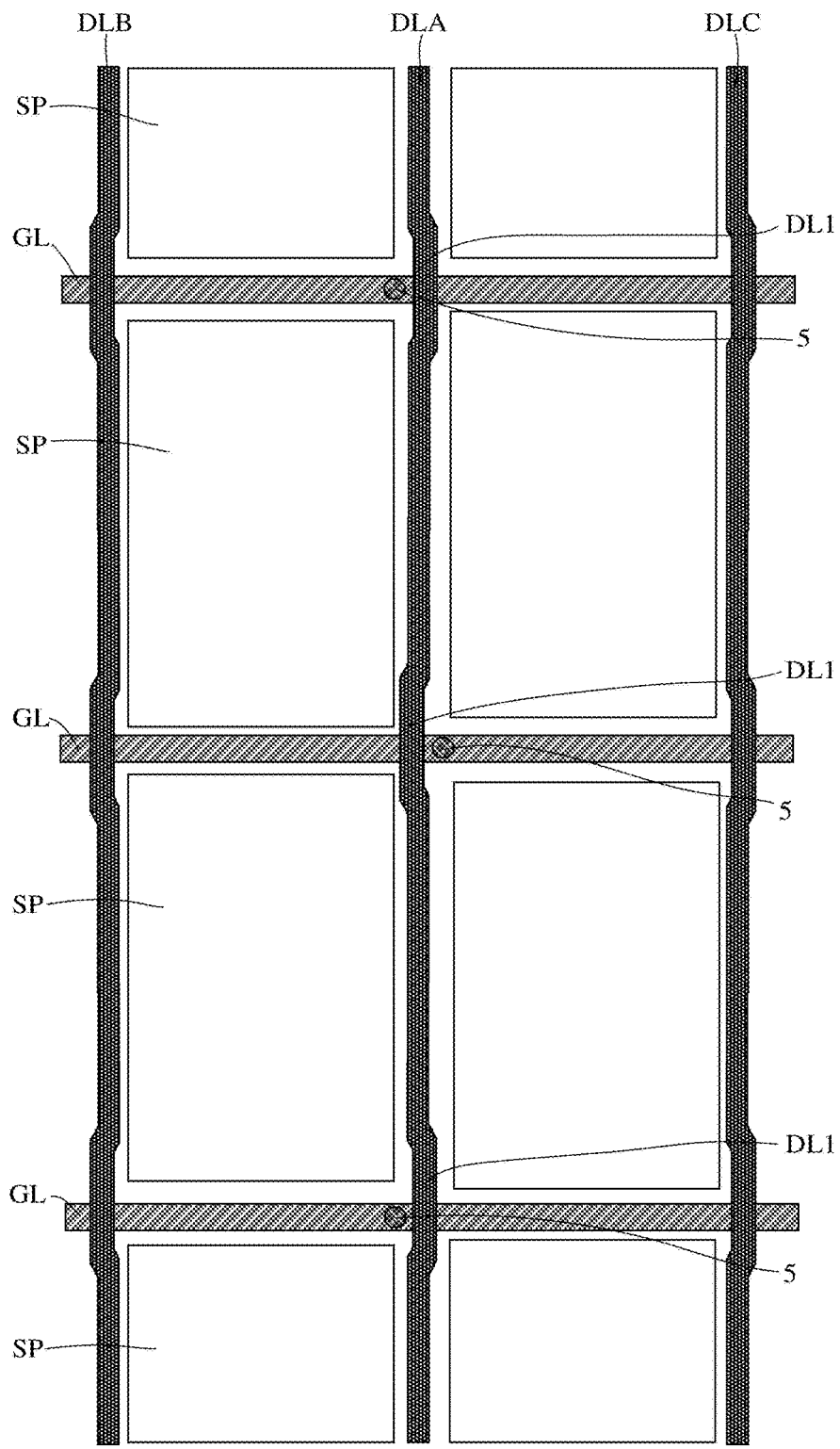

FIG. 11A and FIG. 11B respectively show partial plan views of a display panel according to some exemplary embodiments of the present disclosure, in which a plurality of rows of sub-pixels and a data line extending in the plurality of rows of sub-pixels are schematically shown. It should be noted that some specific structures of the gate line, the common electrode line, the pixel electrode, the thin film transistor and other components are omitted in FIG. 11A and FIG. 11B to emphasize the structure of the data line arranged in the Y direction.

Referring to FIG. 11A, a plurality of spacers 5 are provided in two adjacent columns of sub-pixels (e.g., a column of first sub-pixels and a column of second sub-pixels), and each spacer 5 may be located on the same side of the first data line DLA. For example, each spacer 5 may be located in the first sub-pixel, that is, located on the left side of the first data line DLA. Therefore, at a position corresponding to each spacer 5, the bending portion DL1 of the first data line DLA is bent toward a direction away from the spacer 5 (right direction shown in figure). That is, a plurality of bending portions are provided in the same data line, and the plurality of bending portions have the same bending direction.

Referring to FIG. 11B, a plurality of spacers 5 are provided in two adjacent columns of sub-pixels (e.g., a column of first sub-pixels and a column of second sub-pixels), and the plurality of spacers 5 may be located on different sides of the first data line DLA. For example, some of the spacers 5 may be located in the first sub-pixel, that is, on the left side of the first data line DLA, and some other spacers 5 may be located in the second sub-pixel, that is, on the right side of the first data line DLA. Accordingly, at the position corresponding to each spacer 5, the plurality of bending portions DL1 of the first data line DLA have different bending directions. For example, some bending portions are bent toward the left direction, and some other bending portions are bent toward the right direction. That is, a plurality of bending portions are provided in the same data line, and the plurality of bending portions have different bending directions.

The data lines on both sides of the sub-pixel provided with the spacer includes the bending portion, and one data line may include a plurality of bending portions. Due to the plurality of bending portions, a length of the data lines on both sides of the sub-pixel provided with the spacer is increased. In the embodiments of the present disclosure, the same bending design is also made to the data lines on both sides of the sub-pixel not provided with the spacer, that is, the data lines also include a plurality of bending portions, so that each data line substantially has the same length. In this way, an inconsistency of the lengths of the data lines caused by the bending design of the data line may be avoided, which is beneficial to improve the uniformity of each data line and avoid an inconsistency of signals transmitted on the data lines caused by different resistances of the data lines.

Referring back to FIG. 3 and FIG. 4, the projection of the first widened portion GL1 of the first gate line GL in the Y direction at least partially overlaps the projection of the second widened portion GL2 of the first gate line GL in the Y direction. The orthographic projection of the first spacer 5 on the second base substrate 20 falls within the orthographic projection of the first widened portion GL1 on the second base substrate 20, and an area of the orthographic projection of the first spacer 5 on the second base substrate 20 is less than an area of the orthographic projection of the first widened portion GL1 on the second base substrate 20. The arrangement of the first widened portion GL1 is advantageous to make the projection of the first spacer 5 fall within the projection of the gate line GL. The orthographic projection of the active layer ACT of the thin film transistor 6 on the second base substrate 20 falls within the orthographic projection of the second widened portion GL2 on the second base substrate 20, and an area of the orthographic projection of the active layer ACT of the thin film transistor 6 on the second base substrate 20 is less than an area of the orthographic projection of the second widened portion GL2 on the second base substrate 20. The arrangement of the second widened portion GL2 is advantageous for the gate electrode of the thin film transistor 6 to cover the active layer ACT.

Referring to FIG. 5 and FIG. 6, the first electrode 6S of the thin film transistor 6 includes a first portion 6S1 and a second portion 6S2. The first portion 6S1 is in direct contact with the data line DL (specifically, the second data line DLB). In other words, the first portion 6S1 extends directly from the second data line DLB in the X direction. An orthographic projection of the first portion 6S1 on the second base substrate 20 at least partially overlaps the orthographic projection of the second data line DLB on the second base substrate 20. An orthographic projection of the second portion 6S2 on the second base substrate 20 at least partially overlaps the orthographic projection of the second widened portion GL2 on the second base substrate 20. For example, the orthographic projection of the second portion 6S2 on the second base substrate 20 falls within the orthographic projection of the second widened portion GL2 on the second base substrate 20.

For example, a width (e.g., a size in the Y direction) of the first portion 6S1 is greater than a width (e.g., a size in the X direction) of the second portion 6S2. With such an arrangement, the first electrode 6S and the data line may have a large contact area, which is beneficial to improve an electrical contact capability of the two and also minimize an overlapping area of the first electrode 6S and the gate electrode 6G.

The first electrode 6S of the thin film transistor 6 may further include a third portion 6S3. The third portion 6S3 is arranged obliquely with respect to both the X direction and the Y direction, and the third portion 6S3 is arranged between the first portion 6S1 and the second portion 6S2 to connect the first portion 6S1 and the second portion 6S2.

The second electrode 6D of the thin film transistor 6 includes a first portion 6D1 and a second portion 6D2. The first portion 6D1 partially overlaps the pixel electrode 7. In other words, an orthographic projection of the first portion 6D1 on the second base substrate 20 at least partially overlaps the orthographic projection of the pixel electrode 7 on the second base substrate 20. In this way, the first portion 6D1 may be in electrical contact with the pixel electrode 7 through a via hole VH1. An orthographic projection of the second portion 6D2 on the second base substrate 20 at least partially overlaps the orthographic projection of the second widened portion GL2 on the second base substrate 20. For example, the orthographic projection of the second portion 6D2 on the second base substrate 20 falls within the orthographic projection of the second widened portion GL2 on the second base substrate 20.

For example, a width (e.g., a size in the X direction) of the first portion 6D1 is greater than a width (e.g., a size in the X direction) of the second portion 6D2. With such an arrangement, the second electrode 6D and the pixel electrode may have a large electrical contact area, which is beneficial to improve the electrical contact capability of the two and also minimize an overlapping area of the second electrode 6D and the gate electrode 6G.

The second electrode 6D of the thin film transistor 6 may further include a third portion 6D3. The third portion 6D3 may extend directly from the first portion 6D1 toward the pixel electrode 7. That is, an orthographic projection of the third portion 6D3 on the second base substrate 20 at least partially overlaps the orthographic projection of the pixel electrode 7 on the second base substrate 20. A width (e.g., a size in the X direction) of the third portion 6D3 is greater than a width (e.g., a size in the X direction) of the first portion 6D1.

For example, the second portion 6S2 of the first electrode 6S and the second portion 6D2 of the second electrode 6D are substantially parallel to each other and arranged substantially in the Y direction. A projection of the second portion 6S2 of the first electrode 6S in the Y direction substantially coincides with a projection of the second portion 6D2 of the second electrode 6D in the Y direction. The second portion 6D2 of the second electrode 6D is closer to the first widened portion GL1 than the second portion 6S2 of the first electrode 6S.

Referring to FIG. 3 to FIG. 6, the distance between the orthographic projection of the first spacer 5 on the second base substrate 20 and the orthographic projection of the bending portion DL1 of the first data line DLA on the second base substrate 20 in the X direction may be referred to as a first distance d1, and the distance between the orthographic projection of the first spacer 5 on the second base substrate 20 and the orthographic projection of the second portion 6D2 of the second electrode 6D on the second base substrate 20 in the X direction may be referred to as a second distance d2. For example, the orthographic projection of the first spacer 5 on the second base substrate 20 may have a shape such as a regular polygon or a circle with a center 50, the bending portion DL1 of the first data line DLA includes an edge portion DL3 close to the first spacer 5, and the second portion 6D2 of the second electrode 6D includes an edge portion 6D21 close to the first spacer 5. The first distance d1 may be a distance from the center 50 to the edge portion DL3 in the X direction or may be a spacing distance between the first spacer 5 and the bending portion DL1 in the X direction. The second distance d2 may be a distance from the center 50 to the edge portion 6D21 in the X direction or may be a spacing distance between the first spacer 5 and the second portion 6D2 in the X direction.

Optionally, the first distance d1 may be substantially equal to the second distance d2. That is, the spacer 5 has substantially the same sliding distance toward the left and toward the right in the X direction.

For example, each of the bending connection portions DL12 of the first data line DLA may include an edge portion DL13 close to the spacer 5. A distance between the center 50 and the edge portion DL13 may be represented by a third distance d3. Optionally, the third distance d3 may be substantially equal to the first distance d1.

In an exemplary embodiment, the first distance d1, the second distance d2 and the third distance d3 may be 10 microns or more, for example, within a range of 10 microns to 50 microns. A cell alignment deviation between the first substrate and the second substrate is generally within 8 microns. In a case that the first distance d1, the second distance d2 and the third distance d3 are 10 microns or more, it may be ensured that the projection of the spacer 5 is located between the data line and the thin film transistor.

It should be noted that, in the embodiments of FIG. 3, the projection of the first data line DLA (e.g., the body portion DL2 and the bending connection portions DL12) in the X direction at least partially overlaps the projection of the first widened portion GL1 in the X direction. The embodiments of the present disclosure are not limited thereto, and in other embodiments, the projection of the first data line DLA (e.g., the body portion DL2 and the bending connection portions DL12) in the X direction may not overlap the projection of the first widened portion GL1 in the X direction, that is, may be spaced apart from the projection of the first widened portion GL1 in the X direction.

Referring to FIG. 3 and FIG. 4, the first widened portion GL1 of the gate line GL protrudes toward the common electrode line CL with respect to other portions of the gate line GL (e.g., the second widened portion GL2). The common electrode line CL includes a bending portion CL1. The projection of the bending portion CL1 in the X direction at least partially overlaps the projection of the first widened portion GL1 in the X direction. For example, the projection of the bending portion CL1 in the X direction substantially coincides with the projection of the first widened portion GL1 in the X direction.

Specifically, the common electrode line CL includes a body portion CL2 and a bending portion CL1. In the Y direction, the bending portion CL1 is farther away from the first widened portion GL1 than the body portion CL2. In other words, in the plan view shown in FIG. 3, a distance between the orthographic projection of the bending portion CL1 on the second base substrate 20 and the orthographic projection of the first widened portion GL1 on the second base substrate 20 in the Y direction is greater than a distance between an orthographic projection of the body portion CL2 on the second base substrate 20 and the orthographic projection of the first widened portion GL1 on the second base substrate 20 in the Y direction.

More specifically, the bending portion CL1 includes a bending body portion CL11 and two bending connection portions CL12. The body portion CL2 and the bending body portion CL11 extend straight in the X direction. The two bending connection portions CL12 are respectively located at both ends of the bending body portion CL11, the bending connection portion CL12 at one end is connected to one section of the body portion CL2, and the bending connection portion CL12 at the other end is connected to the other section of the body portion CL2.

It should be noted that, although the common electrode line CL is described by different portions (e.g., the body portion CL2, the bending portion CL1, the bending body portion CL11, the bending connection portion CL12), it should be understood that these portions (e.g., the body portion CL2, the bending portion CL1, the bending body portion CL11, the bending connection portion CL12) are formed as a continuously extending integral structure, that is, the common electrode line CL is a continuously extending structure, rather than being arranged in sections.

By providing the bending portion in the common electrode line CL, the distance between the common electrode line CL and the first widened portion GL1 may be substantially equal to the distance between the common electrode line CL and the second widened portion GL2, so as to avoid a too small gap between the common electrode line CL and the first widened portion GL1.

Referring to FIG. 3 and FIG. 4, the gate line GL includes an inclined portion GL3. An orthographic projection of the inclined portion GL3 on the second base substrate 20 at least partially overlaps the orthographic projection of the data line DL on the second base substrate 20. Specifically, the orthographic projection of the inclined portion GL3 on the second base substrate 20 at least partially overlaps the orthographic projection of the bending portion DL1 of the data line DL on the second base substrate 20.

Referring to FIG. 3, FIG. 4 and FIG. 8 in combination, the gate line GL is substantially arranged in the X direction. For the inclined portion GL3, an angle is formed between the inclined portion GL3 and the X direction. For example, the angle may be in a range of 10 degrees to 50 degrees. At a position where the data line DL overlaps the gate line GL, the data line DL is located above the gate line GL, that is, the data line DL needs to climb across the gate line GL. By providing the inclined portion GL3, a climbing length of the data line DL may be increased, so that a risk of disconnection of the data line DL when climbing the gate line may be reduced.

It should be noted that, although the gate line GL is described by different portions (e.g., the first widened portion GL1, the second widened portion GL2 and the inclined portion GL3) herein, it should be understood that these portions (e.g., the first widened portion GL1, the second widened portion GL2 and the inclined portion GL3) are formed as a continuously extending integral structure, that is, the gate line GL is a continuously extending structure, rather than being arranged in sections.

Further, referring to FIG. 7 to FIG. 9, the second substrate 2 may include a first electrode layer 201, a first conductive layer (a layer where the gate line GL, the gate electrode 6G and the common electrode line CL are located), a gate insulating layer 202, an active layer ACT, an interlayer dielectric layer 207, a second conductive layer (a layer where the first electrode 6S, the second electrode 6D, the data line DL, etc. are located), a passivation layer 204 and a second electrode layer 205 sequentially arranged on the second base substrate 20. The first electrode layer 201 and the second electrode layer 205 may be an ITO electrode layer. For example, a common electrode 8 may be located in the first electrode layer 201, and a pixel electrode 7 may be located in the second electrode layer 205. The common electrode 8 may be electrically connected to the common electrode line CL, and the pixel electrode 7 may be electrically connected to the second electrode 6D of the thin film transistor 6.

Optionally, the second substrate 2 may further include a planarization layer 208 arranged on a side of the passivation layer 204 away from the second base substrate 20.

Referring to FIG. 3 and FIG. 7 in combination, two bump structures including a first bump structure 21 and a second bump structure 22 shown in FIG. 7 are formed on both sides of the spacer 5 in the X direction. An orthographic projection of the first bump structure 21 on the second base substrate 20 at least partially overlaps the orthographic projection of the first data line DLA on the second base substrate 20, and an orthographic projection of the second bump structure 22 on the second base substrate 20 at least partially overlaps the orthographic projection of the thin film transistor 6 on the second base substrate 20. The arrangement of the first data line DLA and the source and drain electrodes of the thin film transistor 6 on the second base substrate 20 causes a greater height at a corresponding position on the second base substrate 20 than at other positions, thereby forming two bump structures 21 and 22.

It should be noted that herein, the "bump structure" included in the second substrate refers to a bump structure formed by a plurality of stacked film layers that is higher than an adjacent portion. Specifically, a distance from an upper surface of the bump structure (that is, a surface away from the second base substrate 20) to the upper surface of the second base substrate 20 is greater than a distance from an upper surface of the alignment film 4 (that is, a surface away from the second base substrate 20) at other positions (e.g., the light transmission region TA) to the upper surface of the second base substrate 20.

In this way, the first bump structure 21 and the second bump structure 22 may function to stop the spacer 5 and limit a movement range of the spacer 5 in the X direction within a range defined by the two bump structures.

Referring to FIG. 3 and FIG. 9, two bump structures including a third bump structure 23 and a fourth bump structure 24 shown in FIG. 9 are further formed on both sides of the spacer 5 in the Y direction. Similarly, each of the third bump structure 23 and the fourth bump structure 24 includes a structure formed by a plurality of stacked film layers that is higher than an adjacent portion.

For example, an orthographic projection of the third bump structure 23 on the second base substrate 20 at least partially overlaps the orthographic projection of the common electrode line CL on the second base substrate 20. Specifically, the orthographic projection of the third bump structure 23 on the second base substrate 20 at least partially overlaps the orthographic projection of the bending portion CL1 of the common electrode line CL on the second base substrate 20. Moreover, the third bump structure 23 includes a first boss 231 located in the second conductive layer. An orthographic projection of the first boss 231 on the second base substrate 20 falls within the orthographic projection of the bending portion CL1 of the common electrode line CL on the second base substrate 20. The bending portion CL1 of the common electrode line CL is widened in order to support the first boss 231. Specifically, a size of the bending body portion CL11 of the bending portion CL1 of the common electrode line CL in the X direction (that is, a width of the bending body portion CL11) is greater than a size of the body portion CL2 of the common electrode line CL in the X direction (that is, a width of the body portion CL2).

The orthographic projection of the third bump structure 23 on the second base substrate 20 at least partially overlaps the orthographic projection of the pixel electrode 7 or the common electrode 8 on the second substrate 20. The pixel electrode 7 or the common electrode 8 is a pixel electrode or a common electrode of a sub-pixel adjacent to the sub-pixel provided with the spacer 5 in the column Y direction.

Thus, the third bump structure 23 is formed by using the bending portion CL1 of the common electrode line CL and providing the separate first boss 231 located in the second conductive layer.

For another example, the fourth bump structure 24 includes a second boss 241 located in the first conductive layer and a third boss 242 located in the second conductive layer. An orthographic projection of the third boss 242 on the second base substrate 20 falls within an orthographic projection of the second boss 241 on the second base substrate 20. By providing the second boss 241 located in the first conductive layer and the third boss 242 located in the second conductive layer, a height at a corresponding position may be increased, thereby forming the fourth bump structure 24.

An orthographic projection of the fourth bump structure 24 on the second base substrate 20 at least partially overlaps the orthographic projection of the pixel electrode 7 or the common electrode 8 on the second base substrate 20. The pixel electrode 7 or the common electrode 8 here is the pixel electrode or the common electrode of the sub-pixel provided with the spacer 5.

The third bump structure 23 and the fourth bump structure 24 are respectively located on both sides of the spacer 5 or the first widened portion GL1 in the Y direction. Specifically, the orthographic projection of the third bump structure 23 on the second base substrate 20 and the orthographic projection of the fourth bump structure 24 on the second base substrate 20 are respectively located on both sides of the orthographic projection of the spacer 5 or the first widened portion GL1 on the second base substrate 20 in the Y direction. In this way, the third bump structure 23 and the fourth bump structure 24 may function to stop the spacer 5 and limit a movement range of the spacer 5 in the Y direction within a range defined by the two bump structures.

The third bump structure 23 includes an edge portion 235 close to the spacer 5, and the fourth bump structure 24 includes an edge portion 245 close to the spacer 5. A distance between the orthographic projection of the spacer 5 on the second base substrate 20 and the orthographic projection of the third bump structure 23 on the second base substrate 20 in the Y direction may be referred to as a fourth distance d4, and a distance between the orthographic projection of the spacer 5 on the second base substrate 20 and the orthographic projection of the fourth bump structure 24 on the second base substrate 20 in the Y direction may be referred to as a fifth distance d5. For example, the fourth distance d4 may be a distance from the center 50 to the edge portion 235 in the Y direction, and the fifth distance d5 may be a distance from the center 50 to the edge portion 245 in the Y direction.

Optionally, the fourth distance d4 may be substantially equal to the fifth distance d5. That is, the spacer 5 has substantially the same sliding distance toward the upper side and toward the lower side in the Y direction.

Optionally, the fourth distance d4 may be greater than or equal to the first distance d1.

In the embodiments of the present disclosure, with such an arrangement, in a case of a displacement of the first substrate 1 in various directions such as up, down, left and right with respect to the second substrate (the displacement may be caused by a cell alignment deviation), the spacer 5 has a sufficient sliding space and may be prevented from sliding into the light transmission region, so that the spacer may be prevented from scratching the alignment film located in the light transmission region.

In the exemplary embodiments described above, the spacer 5 is only provided in the first sub-pixel SP1, and no spacer 5 is provided in the second sub-pixel SP2 and the third sub-pixel SP3. Referring back to FIG. 3 and FIG. 4, a portion of the gate line GL located in the second sub-pixel SP2 does not include the first widened portion GL1 but only includes the second widened portion GL2, and accordingly, a portion of the common electrode line CL located in the second sub-pixel SP2 does not include the widened portion CL1. Similarly, a portion of the gate line GL located in the third sub-pixel SP3 does not include the first widened portion GL1 but only includes the second widened portion GL2, and accordingly, a portion of the common electrode line CL located in the third sub-pixel SP3 does not include the widened portion CL1.

It should be noted that, in the embodiments described above, the first sub-pixel SP1 is a red sub-pixel, the second sub-pixel SP2 is a green sub-pixel, and the third sub-pixel SP3 is a blue sub-pixel. The spacer 5 is arranged in the red sub-pixel SP1, so that an influence of the arrangement of the spacer 5 on a display color temperature and a display color may be avoided. However, the embodiments of the present disclosure are not limited thereto, and the spacer 5 may be arranged in at least one of the first sub-pixel SP1, the second sub-pixel SP2 or the third sub-pixel SP3.

For example, the pixel electrode 7 may be a slit electrode, that is, the pixel electrode 7 has a plurality of slits 71. The common electrode 8 may be a planar electrode, and the common electrode line CL may be electrically connected to the common electrode 8. The orthographic projection of the pixel electrode 7 on the second base substrate 20 at least partially overlaps the orthographic projection of the common electrode 8 on the second base substrate 20.

For example, the display panel according to some exemplary embodiments of the present disclosure may be applied to a liquid crystal display device of ADS (Advanced Super Dimension Switch) mode, IPS mode and the like. In the ADS mode display device, a multi-dimensional electric field is formed by a parallel electric field generated at an edge of pixel electrodes on the same plane and a longitudinal electric field generated between a pixel electrode layer and a common electrode layer, so that the liquid crystal molecules in the liquid crystal cell may be rotated and turned between the pixel electrodes and above the pixel electrodes, thereby improving a plane alignment system liquid crystal operating efficiency and increasing a light transmission efficiency.

It should be noted that the embodiments of the present disclosure are not limited to the above description. For example, in other embodiments, the electrode located in the first electrode layer may be a pixel electrode, and the electrode located in the second electrode layer may be a common electrode.

Referring to FIG. 10, the orthographic projection of each of the spacer 5, the gate line GL, the data line DL, the common electrode line CL and the thin film transistor 6 on the second base substrate 20 falls within the orthographic projection of the black matrix 12 on the second base substrate 20. That is, the spacer 5, the gate line GL, the data line DL, the common electrode line CL and the thin film transistor 6 are all arranged within a coverage region of the black matrix 12, i.e., all located in the opaque region.

Figure 12:
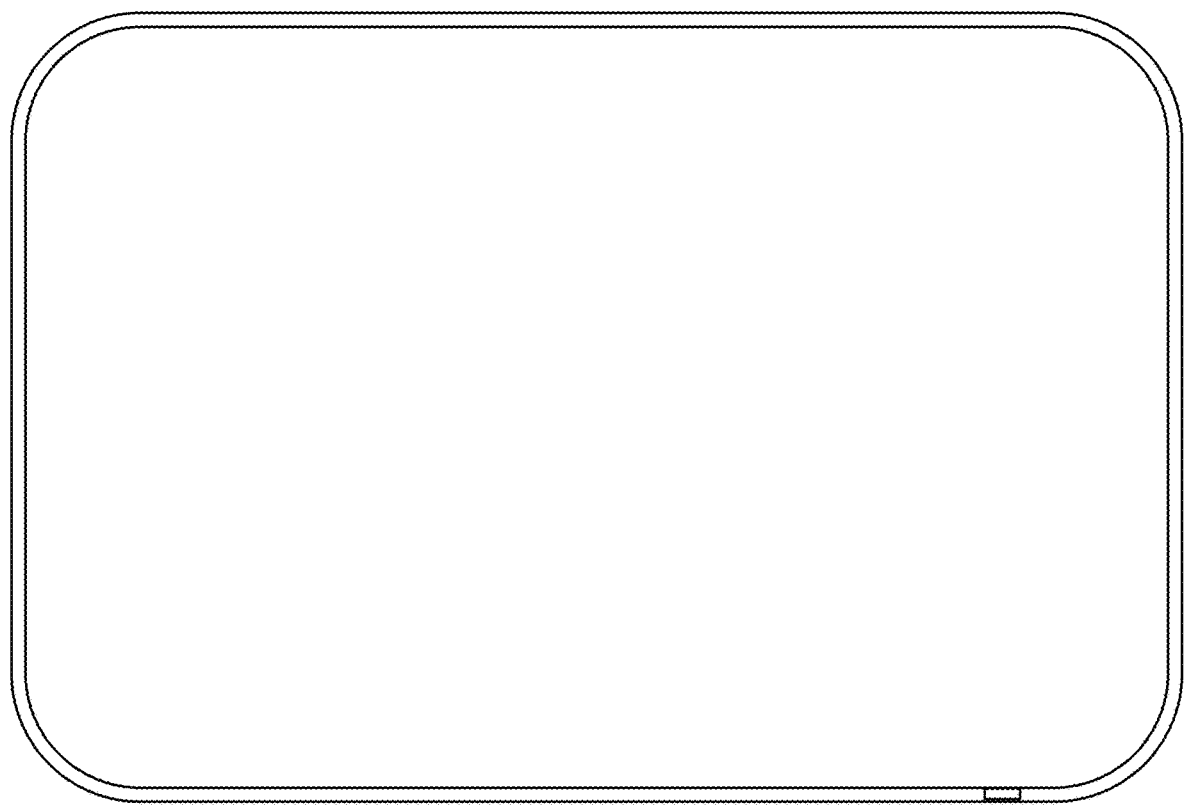
FIG. 12 shows a schematic diagram of a display device according to some exemplary embodiments of the present disclosure.

At least one embodiment of the present disclosure further provides a display device 100. FIG. 12 shows a schematic structural diagram of a display device according to an embodiment of the present disclosure. As shown in FIG. 12, the display device includes the display panel provided according to any of the above embodiments. Therefore, the display device also has a technical effect corresponding to the beneficial effect of the display panel included in the display device, and details may be referred to the above description.

For example, in some examples, the display device may be any product or component with a display function, such as a smart phone, a tablet computer, a television, a display, a notebook computer, a digital photo frame, a navigator, and the like.

The present disclosure may also have other various embodiments. Those skilled in the art may make various corresponding changes and modifications according to the embodiments of the present disclosure without departing from the spirit and essence of the present disclosure. These corresponding changes and modifications should fall within the scope of protection of the appended claims of the present disclosure.

What is claimed is:

1. A display panel, comprising:
   a first substrate, comprising:
     a first base substrate; and
     a plurality of spacers arranged on the first base substrate; and
   a second substrate arranged opposite to the first substrate, comprising:
     a second base substrate;
     a plurality of gate lines and a plurality of data lines arranged on the second base substrate, wherein each of the plurality of gate lines is arranged in a row direction, and each of the plurality of data lines is arranged in a column direction;
     a plurality of sub-pixels arranged on the second base substrate in an array in the row direction and the column direction, wherein the plurality of gate lines and the plurality of data lines intersect to define the plurality of sub-pixels, and each of the plurality of sub-pixels comprises a light transmission region; and a second data line arranged adjacent to the first sub-pixel, wherein the plurality of spacers comprise at least one first spacer, the plurality of data lines comprise at least a first data line, the plurality of sub-pixels comprise a first sub-pixel, and the first data line is arranged adjacent to the first sub-pixel;

wherein an orthographic projection of the first spacer on the second base substrate is adjacent to an orthographic projection of the light transmission region of the first sub-pixel on the second base substrate, and the orthographic projection of the first spacer on the second base substrate is spaced apart from an orthographic projection of the first data line on the second base substrate;

wherein the first data line comprises a body portion and a bending portion, and an orthographic projection of the bending portion on the second base substrate is bent toward a direction away from the orthographic projection of the first spacer on the second base substrate with respect to an orthographic projection of the body portion on the second base substrate;

wherein an orthographic projection of the first data line on the second base substrate and an orthographic projection of the second data line on the second base substrate are respectively located on both sides of the orthographic projection of the first spacer on the second base substrate in the row direction, and a distance between the orthographic projection of the second data line on the second base substrate and the orthographic projection of the first spacer on the second base substrate in the row direction is greater than a distance between the orthographic projection of the first data line on the second base substrate and the orthographic projection of the first spacer on the second base substrate in the row direction;

wherein the second data line comprises a body portion and a bending portion, a projection of the bending portion of the second data line in the row direction at least partially overlaps a projection of the first spacer in the row direction, and an orthographic projection of the bending portion of the second data line on the second base substrate is bent toward a direction away from the orthographic projection of the first spacer on the second base substrate with respect to the orthographic projection of the body portion of the second data line on the second base substrate;

wherein the plurality of gate lines comprise a first gate line arranged adjacent to the first sub-pixel, and the orthographic projection of the first spacer on the second base substrate falls within an orthographic projection of the first gate line on the second base substrate, wherein the first gate line comprises a first widened portion and a second widened portion, an orthographic projection of the first widened portion and the second widened portion on the second base substrate is located between the orthographic projection of the first data line on the second base substrate and the orthographic projection of the second data line on the second base substrate; and wherein the second substrate further comprises a plurality of common electrode lines arranged on the second base substrate, and each of the plurality of common electrode lines is arranged in the row direction, wherein the plurality of common electrode lines comprise a first common electrode line, an orthographic projection of the first common electrode line on the second base substrate is adjacent to the orthographic projection of the first gate line on the second base substrate, the first common electrode line comprises a body portion and a bending portion, a projection of the bending portion of the first common electrode line in the column direction at least partially overlaps a projection of the first widened portion in the column direction, and an orthographic projection of the bending portion of the first common electrode line on the second base substrate is bent toward a direction away from the orthographic projection of the first widened portion on the second base substrate with respect to the orthographic projection of the body portion of the first common electrode line on the second base substrate.

2. The display panel of claim 1, wherein the bending portion comprises a bending body portion and two bending connection portions, an arrangement direction of the bending body portion is parallel to an arrangement direction of the body portion of the first data line, one end of the bending body portion is connected to one section of the body portion of the first data line through one of the bending connection portions, and the other end of the bending body portion is connected to the other section of the body portion of the first data line through the other of the bending connection portions.

3. The display panel of claim 1, wherein the bending portion of the second data line comprises a bending body portion and two bending connection portions, an arrangement direction of the bending body portion of the second data line is parallel to an arrangement direction of the body portion of the second data line, one end of the bending body portion of the second data line is connected to one section of the body portion of the second data line through one of the bending connection portions of the second data line, and the other end of the bending body portion of the second data line is connected to the other section of the body portion of the second data line through the other of the bending connection portions of the second data line.

4. The display panel of claim 1, wherein a size of each of the first widened portion and the second widened portion in the column direction is greater than a size of a remaining portion of the first gate line in the column direction, and the orthographic projection of the first spacer on the second base substrate falls within an orthographic projection of the first widened portion of the first gate line on the second base substrate.

5. The display panel of claim 4, wherein the second substrate further comprises a plurality of thin film transistors arranged on the second base substrate, and the plurality of thin film transistors comprise at least one first thin film transistor arranged adjacent to the first sub-pixel; and wherein an orthographic projection of the first thin film transistor on the second base substrate falls within an orthographic projection of the second widened portion of the first gate line on the second base substrate.

6. The display panel of claim 5, wherein the orthographic projection of the first thin film transistor on the second base substrate is located between the orthographic projection of the first spacer on the second base substrate and the orthographic projection of the bending portion of the second data line on the second base substrate.

7. The display panel of claim 5, wherein the first gate line further comprises a plurality of inclined portions, and an arrangement direction of an orthographic projection of each of the plurality of inclined portions on the second base substrate forms an acute angle with the row direction; and
wherein the orthographic projection of the bending portion of the first data line on the second base substrate at least partially overlaps an orthographic projection of one inclined portion of the first gate line on the second base substrate, and the orthographic projection of the bending portion of the second data line on the second base substrate at least partially overlaps an orthographic projection of another inclined portion of the first gate line on the second base substrate.

8. The display panel of claim 7, wherein the plurality of sub-pixels further comprise a second sub-pixel adjacent to the first sub-pixel, the plurality of data lines further comprise a third data line, the first data line and the third data line are respectively located on both sides of the second sub-pixel; and
wherein the third data line comprises a bending portion, a projection of the bending portion of the third data line in the row direction at least partially overlaps the projection of each of the bending portion of the first data line and the bending portion of the second data line in the row direction, and a bending direction of the bending portion of the third data line is identical with one of a bending direction of the bending portion of the first data line or a bending direction of the bending portion of the second data line; and/or
wherein each of the first data line, the second data line and the third data line comprises a plurality of bending portions; and
wherein the plurality of bending portions included in a same data line have a same bending direction, or at least two of the plurality of bending portions included in a same data line have different bending directions.

9. The display panel of claim 1, wherein the first widened portion protrudes toward the first common electrode line with respect to each of the second widened portion and the inclined portion; and/or
wherein a spacing distance between the first widened portion and the bending portion of the first common electrode line in the column direction is equal to a spacing distance between the second widened portion and the body portion of the first common electrode line in the column direction.

10. The display panel of claim 1, wherein a size of the bending portion of the first common electrode line in the column direction is greater than a size of the body portion of the first common electrode line in the column direction; and/or
wherein the first substrate further comprises a black matrix arranged on the first base substrate, and each of an orthographic projection of the gate line on the first base substrate, an orthographic projection of the data line on the first base substrate, an orthographic projection of the common electrode line on the first base substrate and an orthographic projection of the thin film transistor on the first base substrate falls within an orthographic projection of the black matrix on the first base substrate.

11. The display panel of claim 5, wherein the first thin film transistor comprises an active layer, a gate electrode, a first electrode and a second electrode, and the second substrate further comprises a pixel electrode arranged on the second base substrate;
wherein the first electrode is electrically connected to the second data line, and the second electrode is electrically connected to the pixel electrode;
wherein the first electrode comprises a first portion and a second portion, the first portion of the first electrode extends directly from the second data line in the row direction, and an orthographic projection of the second portion of the first electrode on the second base substrate falls within the orthographic projection of the second widened portion on the second base substrate;
wherein the second electrode comprises a first portion and a second portion, an orthographic projection of the first portion of the second electrode on the second base substrate at least partially overlaps an orthographic projection of the pixel electrode on the second base substrate, and an orthographic projection of the second portion of the second electrode on the second base substrate falls within the orthographic projection of the second widened portion on the second base substrate; and
wherein a size of the first portion of the first electrode in the column direction is greater than a size of the second portion of the first electrode in the row direction, and a size of the first portion of the second electrode in the row direction is greater than a size of the second portion of the second electrode in the row direction.

12. The display panel of claim 11, wherein the second portion of the first electrode is arranged parallel to the second portion of the second electrode, and the second portion of the second electrode is arranged closer to the first widened portion than the second portion of the first electrode; and/or
wherein the orthographic projection of the first spacer on the second base substrate and the orthographic projection of the bending portion of the first data line on the second base substrate are spaced apart in the row direction by a first distance, and the orthographic projection of the first spacer on the second base substrate and the orthographic projection of the second portion of the second electrode on the second base substrate are spaced apart in the row direction by a second distance which is equal to the first distance; and/or
wherein the first distance is greater than or equal to 10 microns; and/or
wherein the second substrate comprises a first electrode layer and a second electrode layer arranged on the second base substrate, and the second electrode layer is arranged on a side of the first electrode layer away from the second base substrate; and
wherein the second substrate further comprises a common electrode arranged on the second base substrate, the pixel electrode is arranged in one of the first electrode layer and the second electrode layer, and the common electrode is arranged in the other of the first electrode layer and the second electrode layer.

13. The display panel of claim 5, wherein the second substrate comprises a first bump structure and a second bump structure arranged on the second base substrate and located on both sides of the first spacer in the row direction; and
wherein an orthographic projection of the first bump structure on the second base substrate at least partially overlaps the orthographic projection of the bending portion of the first data line on the second base substrate, and an orthographic projection of the second bump structure on the second base substrate at least partially overlaps the orthographic projection of the first thin film transistor on the second base substrate; and/or and/or wherein the second substrate further comprises a third bump structure and a fourth bump structure arranged on the second base substrate and located on both sides of the first spacer in the column direction; and wherein an orthographic projection of the third bump structure on the second base substrate at least partially overlaps the orthographic projection of the bending portion of the first common electrode line on the second base substrate, and an orthographic projection of the fourth bump structure on the second base substrate at least partially overlaps the orthographic projection of the pixel electrode of the first sub-pixel on the second base substrate; and/or wherein the second substrate comprises a first conductive layer and a second conductive layer arranged on the second base substrate, and the second conductive layer is arranged on a side of the first conductive layer away from the second base substrate; and wherein the gate line and the common electrode line are located in the first conductive layer, and the data line, the first electrode of the thin film transistor and the second electrode of the thin film transistor are located in the second conductive layer; and/or wherein the third bump structure comprises a first boss located in the second conductive layer, and an orthographic projection of the first boss on the second base substrate falls within the orthographic projection of the bending portion of the first common electrode line on the second base substrate; and/or wherein the fourth bump structure comprises a second boss located in the first conductive layer and a third boss located in the second conductive layer, and an orthographic projection of the third boss on the second base substrate falls within an orthographic projection of the second boss on the second base substrate.

14. The display panel of claim 4, wherein each of the orthographic projection of the first spacer on the second base substrate and the orthographic projection of the first widened portion on the second base substrate has an octagonal shape, and an area of the orthographic projection of the first spacer on the second base substrate is less than an area of the orthographic projection of the first widened portion on the second base substrate.

15. The display panel of claim 1, wherein the first sub-pixel is a red sub-pixel.

16. A display device comprising the display panel of claim 1.

* * * * *